US011698133B2

(12) United States Patent
Uehara et al.

(10) Patent No.: US 11,698,133 B2
(45) Date of Patent: Jul. 11, 2023

(54) POWER TRANSMISSION DEVICE

(71) Applicant: JATCO LTD, Fuij (JP)

(72) Inventors: Hiroki Uehara, Kanagawa (JP);
Masumi Fujikawa, Kanagawa (JP);
Toshikazu Oshidari, Kanagawa (JP)

(73) Assignee: Jateo Ltd, Fuji (JP)

( * ) Notice: Subject to any disclaimer, the term of this patent is extended or adjusted under 35 U.S.C. 154(b) by 130 days.

(21) Appl. No.: 17/429,306

(22) PCT Filed: Nov. 12, 2019

(86) PCT No.: PCT/JP2019/044223
§ 371 (c)(1),
(2) Date: Aug. 6, 2021

(87) PCT Pub. No.: WO2020/183787
PCT Pub. Date: Sep. 17, 2020

(65) Prior Publication Data
US 2022/0196149 A1   Jun. 23, 2022

(30) Foreign Application Priority Data
Mar. 10, 2019   (JP) ............................. JP2019-043243

(51) Int. Cl.
*F16H 63/30*     (2006.01)
*B60K 1/00*      (2006.01)
(Continued)

(52) U.S. Cl.
CPC ........... *F16H 63/3003* (2013.01); *B60K 1/00* (2013.01); *B60K 17/06* (2013.01); *F16H 57/02* (2013.01);
(Continued)

(58) Field of Classification Search
CPC ................. F16H 63/3003; F16H 57/02; F16H 2057/02034; F16H 2057/02052;
(Continued)

(56) References Cited

U.S. PATENT DOCUMENTS 5,538,482 A * 7/1996 Tanzer ............... F16H 63/3026
                                                        475/312
6,193,629 B1 * 2/2001 Tenzor .................. F16H 63/304
                                                        475/201
(Continued)

FOREIGN PATENT DOCUMENTS

CN     205371521 U    7/2016
CN     206031067 U    3/2017
(Continued)

OTHER PUBLICATIONS

Extended Search Report for the corresponding European patent application No. 19918518.2 dated Apr. 4, 2022.

*Primary Examiner* — Justin Holmes
(74) *Attorney, Agent, or Firm* — Global IP Counselors, LLP

(57) ABSTRACT

A power transmission device includes a motor having a motor shaft, a transmission mechanism, a reduction gear, and a case member. The transmission mechanism is connected downstream of the motor. The transmission mechanism has a band brake, and an actuator. A reduction gear is arranged downstream of the transmission mechanism. The case member houses the motor, at least a part of the transmission mechanism, and the reduction gear. The case member has an outer circumference wall that surrounds an outer circumference with respect to a radial direction perpendicular to a rotation axis of the motor shaft, and a side wall that is linked to the outer circumference wall, and that extends outwardly in the radial direction from the outer circumference wall. The actuator is provided adjacent to the (Continued)

outer circumference wall, and adjacent to the side wall, the actuator overlapping with the band brake in the radial direction.

10 Claims, 14 Drawing Sheets

(51) Int. Cl.
*B60K 17/06* (2006.01)
*F16H 57/02* (2012.01)

(52) U.S. Cl.
CPC ............... *B60K 2001/001* (2013.01); *F16H 2057/02034* (2013.01); *F16H 2057/02052* (2013.01)

(58) Field of Classification Search
CPC ...... F16H 3/54; F16H 3/58; F16H 2200/0034; F16H 2200/2035; F16H 37/0813; F16H 37/082; F16H 2200/0021; F16H 2200/2005; B60K 1/00; B60K 17/06; B60K 2001/001; B60Y 2200/91; B60Y 2400/73

See application file for complete search history.

(56) References Cited

U.S. PATENT DOCUMENTS

| | | | |
|---|---|---|---|
| 2007/0179010 A1* | 8/2007 | Pritchard | F16H 3/54 475/323 |
| 2016/0039277 A1 | 2/2016 | Falls et al. | |

FOREIGN PATENT DOCUMENTS

| | | | |
|---|---|---|---|
| DE | 19909751 B4 * | 2/2016 | ......... F16H 63/3003 |
| EP | 851154 A2 * | 7/1998 | ......... F16H 63/3003 |
| JP | S49-11788 Y1 | 3/1974 | |
| JP | H05-330352 A | 12/1993 | |
| JP | H07-069087 A | 3/1995 | |
| JP | H10-294186 A | 11/1998 | |
| JP | 2018-118616 A | 8/2018 | |

* cited by examiner

POWER TRANSMISSION DEVICE

CROSS-REFERENCE TO RELATED APPLICATIONS

This is a U.S. national phase application of PCT/JP2019/044223, filed on Nov. 12, 2019, which claims priority to Japanese Patent Application No. 2019-043243, filed on Mar. 10, 2019. The entire disclosure of Japanese Patent Application No. 2019-043243 is hereby incorporated herein by reference.

TECHNICAL FIELD

The present invention relates to a power transmission device.

BACKGROUND ART

Disclosed in Japanese Laid-Open Patent Publication No. 2018-118616 is a stepped transmission mechanism that switches between low gear level and high gear level by switching using a meshing type engagement device.

SUMMARY

Instead of a meshing type engagement device, it is possible to use a band brake.

At that time, there is a demand to suppress an increase in size of the power transmission device that comprises a stepped transmission mechanism having a band brake.

One embodiment of the present invention is a power transmission device configured having: a motor, a transmission mechanism connected downstream of the motor, a reduction gear arranged downstream of the transmission mechanism, and a case member that houses the motor, the transmission mechanism, and the reduction gear, wherein the transmission mechanism has a band brake, and an actuator that drives the band brake, the case member has an outer circumference wall that surrounds the radial outer circumference, and a side wall that is linked to the outer circumference wall, and that extends facing radially outward from the outer circumference wall, and the actuator is provided adjacent to the outer circumference wall, and adjacent to the side wall.

According to the present invention, it is possible to make a power transmission device comprising a stepped transmission mechanism that has a band brake smaller.

DETAILED DESCRIPTION OF EMBODIMENTS

First Embodiment

Following, a first embodiment of the present invention is explained.

Figure 1:
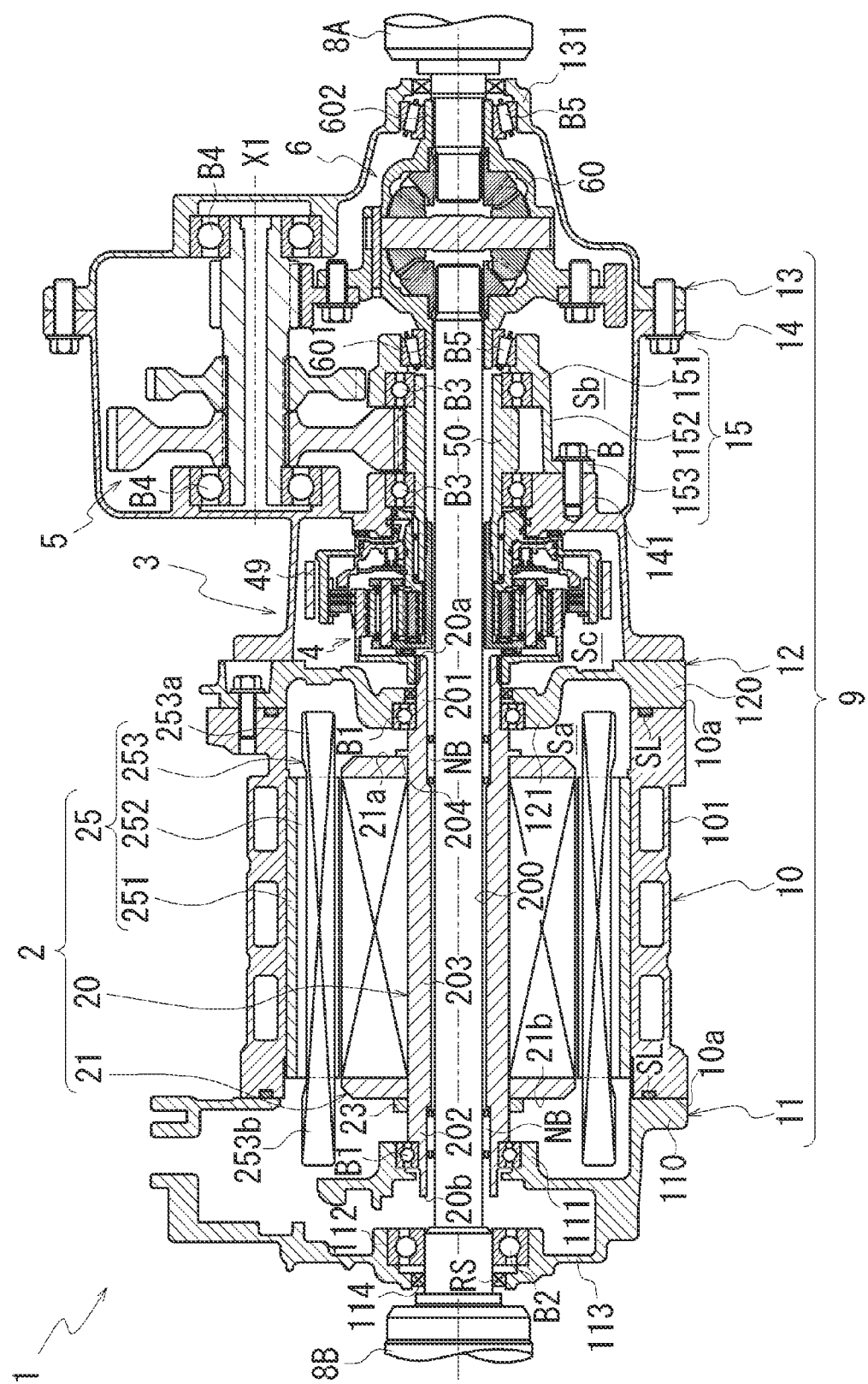
FIG. 1 is a drawing for explaining a power transmission device of a first embodiment.

FIG. 1 is a drawing for explaining a power transmission device 1 of the first embodiment.

Figure 2:
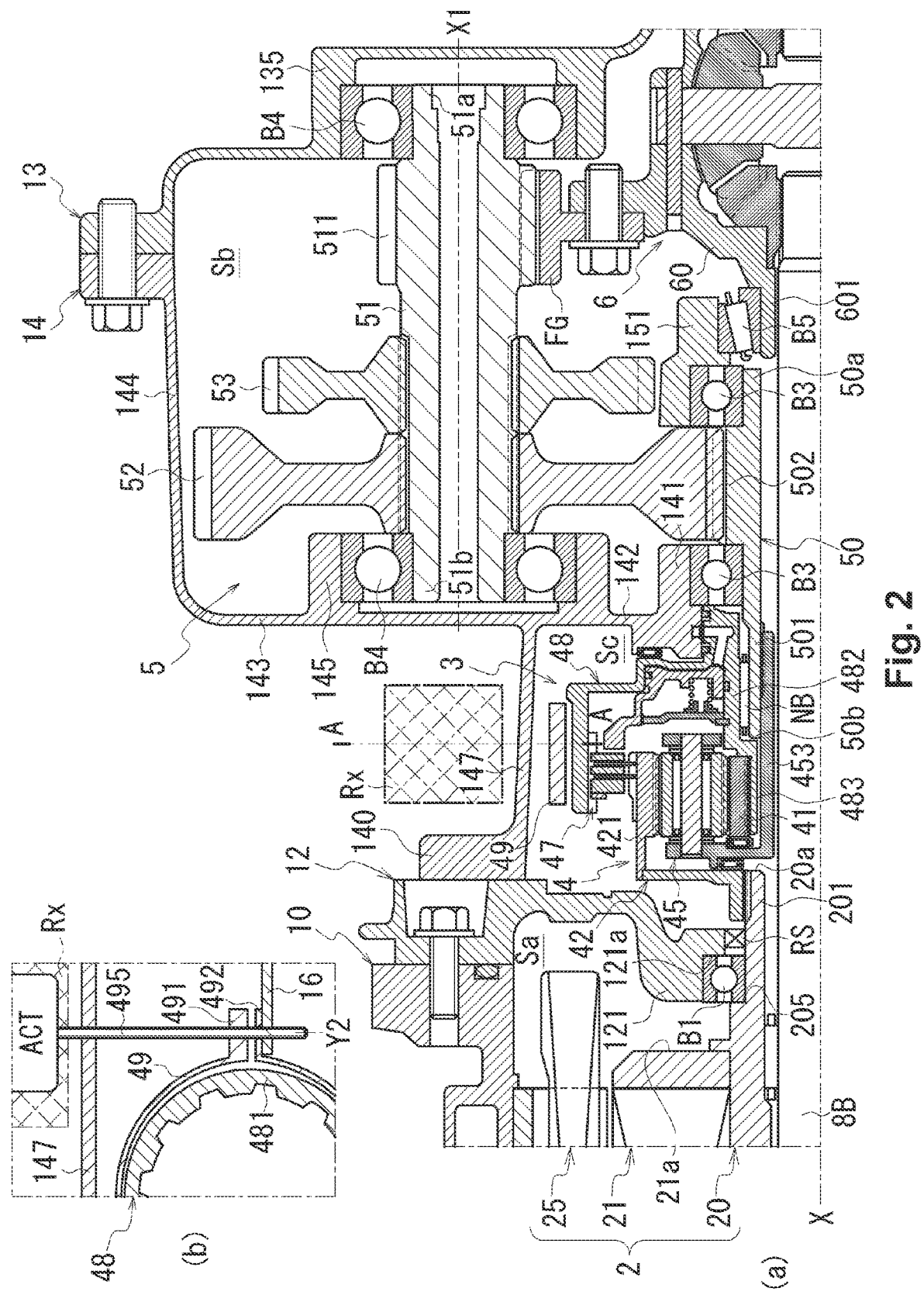
FIG. 2 is an enlarged view of the range from a motor of the power transmission device to a counter gear.

FIG. 2 (*a*) is an enlarged view around a counter gear 5 of the power transmission device 1. FIG. 2 (*b*) is a drawing for explaining a region Rx in which an actuator ACT is arranged, and is a drawing showing an enlarged cross section of A-A in FIG. 2 (*a*). With FIG. 2 (*b*), an illustration of members positioned at the inner diameter side of a clutch drum 48 is omitted.

As shown in FIG. 1, with the power transmission device 1, the transmission mechanism 3, the counter gear 5, the differential device 6, and the drive shafts 8 (8A, 8B) are provided along the transmission route of the output rotation of the motor 2.

After being shifted by the transmission mechanism 3, the output rotation of the motor 2 is reduced by the counter gear 5, and transmitted to the differential device 6. With the differential device 6, the transmitted rotation is transmitted via the drive shafts 8 (8A, 8B) to drive wheels (not illustrated) at left and right of a vehicle in which the power transmission device 1 is mounted. In FIG. 1, the drive shaft 8A is connected so that rotation can be transmitted to the left wheel of the vehicle in which the power transmission device 1 is mounted, and the drive shaft 8B is connected to be able to transmit rotation to the right wheel.

Here, the transmission mechanism 3 is connected downstream of the motor 2, the counter gear 5 is connected downstream of the transmission mechanism 3, the differential device 6 is connected downstream of the counter gear 5, and the drive shafts 8 (8A, 8B) are connected downstream of the differential device 6.

With the present embodiment, a body case 9 of the power transmission device 1 is constituted by a motor housing 10, an outer cover 11, an inner cover 12, an outer case 13, and an inner case 14.

A case (first case member) of the motor 2 is constituted by the motor housing 10, the outer cover 11, and the inner cover 12.

A case (second case member) that houses the transmission mechanism 3, the counter gear 5, and the differential device 6 is constituted by the outer case 13 and the inner case 14.

Here, a space Sa formed between the outer cover 11 and the inner cover 12 on the inner diameter side of the motor housing 10 serves as the motor chamber that houses the motor 2.

As shown in FIG. 2, the space formed between the outer case 13 and the inner case 14 is partitioned into a space Sb that houses the counter gear 5 and the differential device 6, and a space Sc that houses the transmission mechanism 3, by a partition wall 142 provided in the inner case 14.

Thus, the space Sb serves as a first gear chamber that houses the counter gear 5 and the differential device 6, and the space Sc serves as a second gear chamber that houses the transmission mechanism 3.

As shown in FIG. 1, the motor 2 has: a cylindrical motor shaft 20; a cylindrical rotor core 21 externally fitted on the motor shaft 20; and a stator core 25 that surrounds the outer circumference of the rotor core 21 with a prescribed gap.

The motor shaft 20 is a cylindrical member that has an insertion hole 200 for the drive shaft 8B, and the motor shaft 20 is externally fitted on the drive shaft 8B.

With the insertion hole 200 of the motor shaft 20, a linking part 201 of one end 20a side in the longitudinal direction, and a supported part 202 of another end 20b side are formed with an inner diameter that is larger than an intermediate area 203 between the linking part 201 and the supported part 202 in the rotation axis X direction.

The inner circumference of the linking part 201 and the inner circumference of the supported part 202 are supported by needle bearings NB, NB that are externally fitted on the drive shaft 8B.

In this state, the motor shaft 20 is provided to be able to rotate relatively with respect to the drive shaft 8B.

With the motor shaft 20, bearings B1, B1 are externally fitted and fixed to the outer circumference of the linking part 201 of the one end 20a side, and the outer circumference of the supported part 202 of the other end 20b side.

The one end 20a side of the motor shaft 20 is supported by a motor support unit 121 positioned at the inner diameter side of the inner cover 12 with the bearing B1 interposed.

The other end 20b side of the motor shaft 20 is supported by a motor support unit 111 at the inner diameter side of the outer cover 11 with the bearing B1 interposed.

The motor housing 10 that surrounds the outer circumference of the rotor core 21 with a prescribed gap has a cylindrical peripheral wall part 101. With the motor housing 10, seal rings SL, SL are provided on one end 10a and another end 10b in the rotation axis X direction. The one end 10a of the motor housing 10 is joined without a gap to a ring shaped junction part 120 of the inner cover 12 by the seal ring SL provided at the one end 10a.

The other end 10b of the motor housing 10 is joined without a gap to a ring shaped junction part 110 of the outer cover 11 by the seal ring SL provided at the other end 10b.

In this state, at the inner diameter side of a coil end 253a noted later, the motor support unit 121 at the inner cover 12 side is arranged facing a one end part 21a of the rotor core 21 with a gap open in the rotation axis X direction.

At the inner diameter side of a coil end 253b noted later, the motor support unit 111 of the outer cover 11 side is arranged facing another end part 21b of the rotor core 21 with a gap opened in the rotation axis X direction.

Inside the motor housing 10, the rotor core 21 is arranged between the motor support unit 111 of the outer cover 11 side, and the motor support unit 121 of the inner cover 12 side.

The rotor core 21 is formed by laminating a plurality of silicon steel sheets, and each of the silicon steel sheets is externally fitted on the motor shaft 20 in a state where relative rotation with the motor shaft 20 is regulated.

Seen from the rotation axis X direction of the motor shaft 20, the silicon steel sheet has a ring shape, and at the outer peripheral side of the silicon steel sheet, N pole and S pole magnets (not illustrated) are provided alternately in the circumferential direction around the rotation axis X.

The one end part 21a of the rotor core 21 in the rotation axis X direction is positioned using a large diameter part 204 of the motor shaft 20. The other end part 21b of the rotor core 21 is positioned using a stopper 23 press fitted in the motor shaft 20.

The stator core 25 is formed by laminating a plurality of electromagnetic steel sheets, and each of the electromagnetic steel sheets has a ring-shaped yoke part 251 fixed to the inner circumference of the motor housing 10, and a teeth part 252 projecting to the rotor core 21 side from the inner circumference of the yoke part 251.

With the present embodiment, the stator core 25 having a configuration in which a winding 253 is distributed and wound around a plurality of teeth parts 252 is adopted, and the stator core 25 has a longer length in the rotation axis X direction than the rotor core 21 by the amount of the coil ends 253a, 253b projecting in the rotation axis X direction.

It is also possible to adopt the stator core of a configuration in which the windings are concentrically wound on each of the plurality of teeth parts 252 projecting to the rotor core 21 side.

As shown in FIG. 2, with the one end 20a of the motor shaft 20, the motor support unit 121 of the inner cover 12 is positioned inside the space Sc penetrating the transmission mechanism 3 side (right side in the drawing).

A lip seal RS is arranged on the inner circumference of the motor support unit 121.

The lip seal RS seals the gap between the inner circumference of the motor support unit 121 and the outer circumference of the motor shaft 20.

The lip seal RS partitions the space Sa of the inner diameter side of the motor housing 10, and the space Sc of the inner diameter side of the inner case 14, and is provided to block entry of oil OL to inside the space Sa from the space Sc side.

Figure 3:
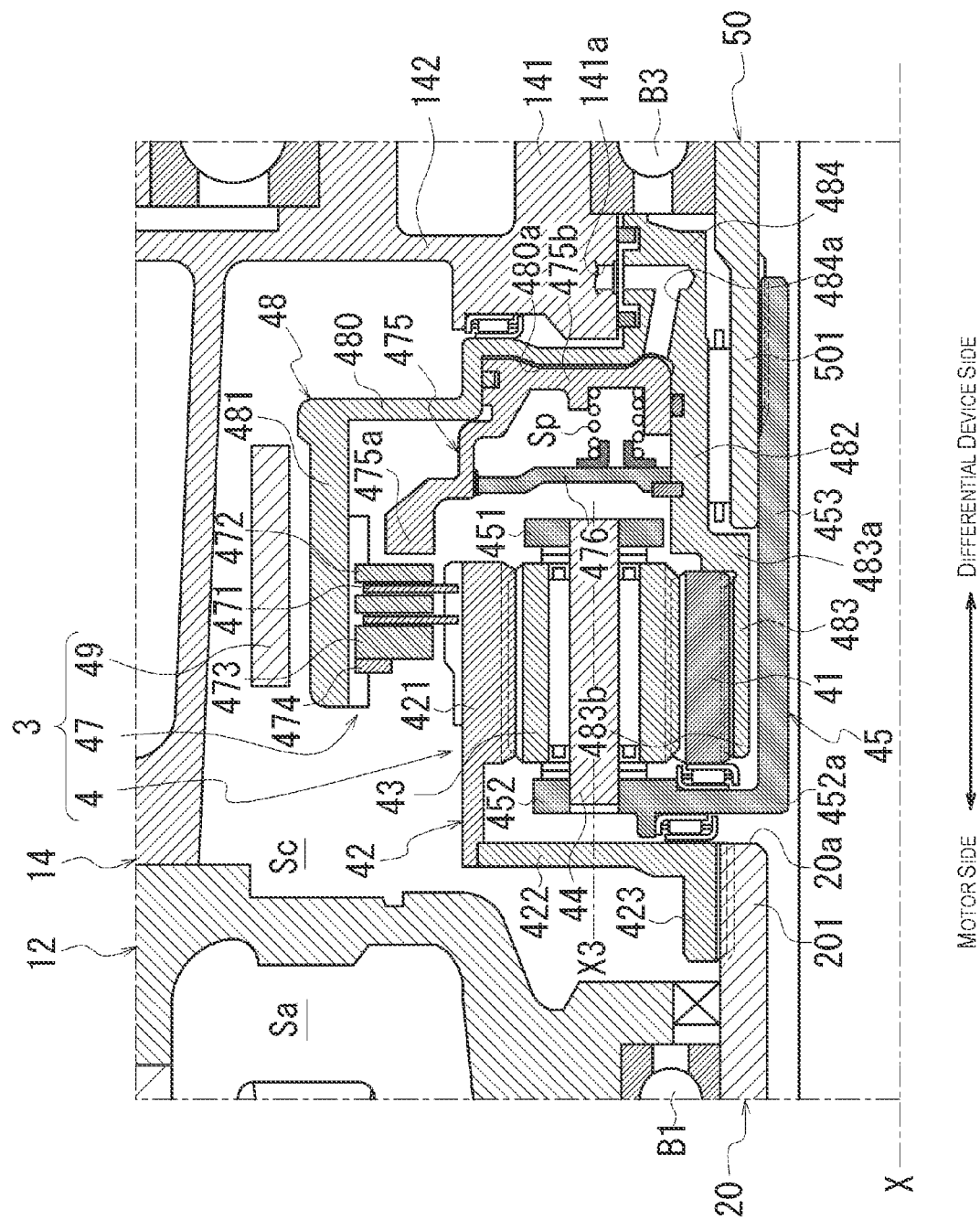
FIG. 3 is a drawing for explaining a transmission mechanism of the power transmission device.

FIG. 3 is a drawing for explaining the transmission mechanism 3.

The transmission mechanism 3 is arranged inside the space Sc.

The transmission mechanism 3 has a planetary gear set 4, a clutch 47, and a band brake 49.

The planetary gear set 4 has a sun gear 41, a ring gear 42, a pinion gear 43, a pinion shaft 44, and a carrier 45.

The constitutional elements of the planetary gear set 4 (sun gear 41, ring gear 42, pinion gear 43, pinion shaft 44, carrier 45) are provided on the inner diameter side of an outer wall part 481 of a clutch drum 48.

The clutch 47 has: a drive plate 471 (inner diameter side friction plate) spline fitted to the outer circumference of the ring gear 42; a driven plate 472 (outer diameter side friction plate) spline fitted to the inner circumference of the outer wall part 481 of the clutch drum 48; and a piston 475 provided to be able to move in the rotation axis direction.

The clutch drum 48 has the outer wall part 481, a disk part 480, an inner wall part 482, and a linking part 483.

The outer wall part 481 has a cylindrical shape that surrounds the rotation axis X with a prescribed gap. The disk part 480 extends to the inner diameter side from the end part of the differential device 6 side (right side in the drawing) of the outer wall part 481. The area of the inner diameter side of the disk part 480 is a recess 480a recessed in the direction away from the planetary gear set 4.

The inner wall part 482 is formed in a cylinder shape that surrounds the rotation axis X with a prescribed gap. The inner wall part 482 extends to the planetary gear set 4 side (left side in the drawing) from the end part of the inner diameter side of the disk part 480, and the tip of the inner wall part 482 faces the meshing portion of the sun gear 41 and the pinion gear 43 with a gap open in the rotation axis X direction.

The linking part 483 has a cylindrical shape that surrounds the rotation axis X with a prescribed gap. With the linking part 483, a base end part 483a in the longitudinal direction is linked to the inner circumference of the tip side of the inner wall part 482.

The linking part 483 extends in a straight line in the direction approaching the motor 2 (leftward in the drawing) on the extension of the linking part 201 of the motor shaft 20 noted above. A tip 483b of the linking part 483 is positioned further to the motor 2 side than the outer wall part 481.

The clutch drum 48 consisting of the outer wall part 481, the disk part 480, the inner wall part 482, and the linking part 483 has an opening provided facing the motor 2 side, and the sun gear 41 of the planetary gear set 4 is spline fitted to the outer circumference of the linking part 483 positioned on the inner diameter side.

With the planetary gear set 4, the ring gear 42 is positioned at the outer diameter side of the sun gear 41. The ring gear 42 has: a peripheral wall part 421 that surrounds the outer circumference of the sun gear 41 with a prescribed gap; a disk part 422 that extends to the inner diameter side from the end part of the motor 2 side of the peripheral wall part 421; and a linking part 423 that extends to the motor 2 side from the end part of the inner diameter side of the disk part 422.

The linking part 423 has a ring shape that surrounds the rotation axis X with a prescribed gap, and the linking part 201 of the one end 20a side of the motor shaft 20 is spline fitted to the inner circumference of the linking part 423.

With the peripheral wall part 421 positioned further to the outer diameter side than the linking part 423, the outer circumference of the pinion gear 43 engages with the inner circumference of the area positioned at the outer diameter side of the sun gear 41.

The pinion gear 43 engages with the inner circumference of the peripheral wall part 421 of the ring gear 42, and the outer circumference of the sun gear 41.

The pinion shaft 44 that supports the pinion gear 43 is provided facing along axis line X3 that is parallel to the rotation axis X. One end and the other end of the pinion shaft 44 are supported by a pair of side plates 451, 452 that constitute the carrier 45.

The side plates 451, 452 are provided in parallel to each other with a gap open in the axis line X3 direction.

One side plate 452 positioned at the motor 2 side extends more to the rotation axis X side than the other side plate 451. A cylindrical linking part 453 that surrounds the rotation axis X with a prescribed gap is integrally formed with an end part 452a of the inner diameter side of the side plate 452.

The linking part 453 extends on the rotation axis X side (inner diameter side) of the linking part 201 of the motor shaft 20 in the direction away from the motor 2 along the rotation axis X.

The linking part 453 is provided crossing the inner diameter side of the sun gear 41 from the motor 2 side to the differential device 6 side, and the linking part 453 is spline fitted to the inner circumference of a linking part 501 of a hollow shaft 50 at the inner diameter side of the inner wall part 482 of the clutch drum 48.

The driven plate 472 of the clutch 47 is spline fitted to the inner circumference of the outer wall part 481 of the clutch drum 48. The drive plate 471 of the clutch 47 is spline fitted to the outer circumference of the peripheral wall part 421 of the ring gear 42.

The drive plate 471 and the driven plate 472 are provided alternately between the peripheral wall part 421 of the ring gear 42 and the outer wall part 481 of the clutch drum 48.

A retaining plate 473 positioned by a snap ring 474 is positioned at the motor 2 side of an area in which the drive plate 471 and the driven plate 472 are alternately provided, and a pressing unit 475a of the piston 475 is positioned at the differential device 6 side.

A base 475b of the inner diameter side of the piston 475 is provided at a position farther from the planetary gear set 4 than the pressing unit 475a on the outer diameter side. The base 475b of the inner diameter side of the piston 475 is internally fitted in the recess 480a of the inner diameter side of the disk part 480 adjacent in the rotation axis X direction.

A spring Sp supported by a spring retainer 476 is pressure welded from the rotation axis X direction on the surface of the motor 2 side (left side in the drawing) of the base 475b.

The piston 475 is energized to the differential device 6 side by the energizing force acting from the spring Sp.

With the clutch drum 48, at the boundary of the recess 480a and the inner wall part 482, a projection 484 that projects to the differential device 6 side is provided. The projection 484 is inserted in the inner circumference of a first support unit 141 of a bearing B3. A supply channel 141a of the oil OL is opened in the inner circumference of the first support unit 141.

In the interior of the projection 484, provided is an oil passage 484a for guiding the oil OL supplied from the first support unit 141 side to inside the recess 480a of the clutch drum 48.

The oil OL supplied via the oil passage 484a is supplied to an oil chamber between the base 475b of the piston 475 and the recess 480a, and displaces the piston 475 to the motor 2 side.

When the piston 475 is displaced to the motor 2 side, the drive plate 471 and the driven plate 472 of the clutch 47 are gripped between the pressing unit 475a of the piston 475 and the retaining plate 473.

By doing this, the relative rotation of the ring gear 42 to which the drive plate 471 is spline fitted, and the clutch drum 48 to which the driven plate 472 is spline fitted is regulated according to the pressure of the supplied oil OL, and finally the relative rotation is regulated.

Furthermore, the band brake 49 is wound around the outer circumference of the outer wall part 481 of the clutch drum 48. When the winding radius of the band brake 49 is narrowed by an actuator ACT (see FIG. 2), the rotation of the clutch drum 48 around the rotation axis X is regulated.

As shown in FIG. 2, the inner case 14 that houses the transmission mechanism 3 has: an outer circumference wall 147 that surrounds the outer circumference of the transmission mechanism 3 with a prescribed gap; a side wall 143 extending to the outer diameter side from the connecting part of the outer circumference wall 147 and the partition wall 142; and a peripheral wall part 144.

The side wall 143 extends to the radial outward side of the rotation axis X on an extension of the partition wall 142, and the end part of the outer diameter side of the side wall 143 is linked to the peripheral wall part 144 surrounding the outer circumference of the counter gear 5 with a prescribed gap.

With the outer circumference wall 147, a junction part 140 with the inner cover 12 is provided at the tip end part of the inner cover 12 side (left side in the drawing), and the junction part 140 is joined to the inner cover 12 from the rotation axis X direction.

The actuator ACT of the band brake 49 is provided in a region that is the region Rx of the outer diameter side of the outer circumference wall 147, and that overlaps with the side wall 143 in the rotation axis X direction.

When viewed from the rotation axis X direction, the region in which the actuator ACT is provided has a positional relationship overlapping the side wall 143.

As shown in FIG. 2 (*b*), the actuator ACT has a shaft 495 that rotates by the rotational drive force of a drive motor (not illustrated).

The tip side of the shaft 495 penetrates a connection piece 491 provided at one end of the band brake 49 in the circumferential direction, a connection piece 492 provided at the other, and a fixed piece 16 provided in the inner case 14.

When the shaft 495 rotates in one direction around the axis line Y2 by the drive of the actuator ACT, one connecting piece 491 is displaced in the direction approaching the other connecting piece 492 that is fixed to the fixed piece 16.

Having done that, the winding radius of the band brake 49 wound on the outer wall part 481 of the clutch drum 48 is narrowed, and the rotation of the clutch drum 48 around the rotation axis X is regulated.

Thus, during operation of the band brake 49, the shaft 495 is rotated by the actuator ACT, and the rotation of the clutch drum 48 is regulated.

With the transmission mechanism 3, the planetary gear set 4 and the clutch 47 are positioned at the inner diameter side of the band brake 49. The actuator ACT, the band brake 49, the planetary gear set 4, and the clutch 47 overlap in the radial direction of the rotation axis X, and when viewed from radially outward of the rotation axis X, the actuator ACT, the band brake 49, the planetary gear set 4, and the clutch 47 are provided in an overlapping positional relationship.

With the transmission mechanism 3 of the present embodiment, the ring gear 42 of the planetary gear set 4 serves as the input unit of the outputted rotation of the motor 2, and the carrier 45 as the output unit of the inputted rotation.

With the transmission mechanism 3, the specification is that switching between the low gear level and the high gear level is performed by changing the combination of the engagement/release of the clutch 47, and the operation of the band brake 49.

The transmission mechanism 3 is able to switch between the low gear level and the high gear level.

With the transmission mechanism 3, low gear level is realized with the following condition (a), and high gear level is realized with condition (b).

(a) Band brake 49: Operated, Clutch 47: Released
(b) Band brake 49: Not operated, Clutch 47: Engaged Here, the transmission mechanism 3 is a two-level transmission mechanism, where low gear level and high gear level are in the same rotational direction (forward level or reverse level). Switching of forward and reverse is possible by forward/reverse rotation of the motor 2.

After being shifted by the transmission mechanism 3, the output rotation of the motor 2 is outputted to the hollow shaft 50 to which the linking part 453 of the carrier 45 is linked.

As shown in FIG. 2, with the hollow shaft 50 to which rotation shifted by the transmission mechanism 3 is inputted, one end 50*a* in the longitudinal direction is provided with a gap open in the rotation axis X direction on a bearing B5 that supports a support unit 601 of the differential case 60. An other end 50*b* of the hollow shaft 50 serves as the linking part 501 with the planetary gear set 4.

The outer circumference of the linking part 501 is supported by the needle bearing NB interposed between itself and the inner wall part 482 of the clutch drum 48.

A gear part 502 is formed integrally at the outer circumference of the one end 50*a* side of the hollow shaft 50. Bearings B3, B3 are externally fitted on both sides of the gear part 502.

The bearing B3 of the one end 50*a* side is supported by a support unit 151 of the inner case 14 side, and the bearing B3 of the other end 50*b* side is supported by the first support unit 141 of the inner case 14.

A large diameter gear 52 of the counter gear 5 is engaged capable of rotation transmission to the outer circumference of the gear part 502. In the counter gear 5, the large diameter gear 52 is spline fitted to the outer circumference of a cylindrical hollow shaft part 51.

At a one end part 51*a* and another end part 51*b* in the longitudinal direction of the hollow shaft part 51, a bearing B4 is externally fitted. The bearing B4 externally fitted to the one end part 51*a* of the hollow shaft part 51 is inserted in a cylindrical second support unit 135 of the outer case 13. The one end part 51*a* of the hollow shaft part 51 is supported to be able to rotate by the second support unit 135 of the outer case 13 via the bearing B4.

The bearing B4 that is externally fitted in the other end part 51*b* of the hollow shaft part 51 is inserted in a cylindrical second support unit 145 of the inner case 14. The other end part 51*b* of the hollow shaft part 51 is supported to be able to rotate on the second support unit 145 of the inner case 14 via the bearing B4.

In this state, the hollow shaft part 51 of the counter gear 5 is provided along a rotation axis X1 parallel to the rotation axis X.

With the hollow shaft part 51, a parking gear 53 is provided adjacent to the one end part 51*a* side (left side in the drawing) when viewed from the large diameter gear 52.

With the hollow shaft part 51, a small diameter gear part 511 is provided at a position separated from the one end part 51*a* side (right side in the drawing) when viewed from the parking gear 53. The small diameter gear part 511 is integrally formed with the hollow shaft part 51, and is formed with an outer diameter R2 that is smaller than outer diameter R1 of the large diameter gear 52 (see FIG. 4: R1>R2).

The small diameter gear part 511 is engaged to be able to do rotation transmission with a final gear FG fixed to the differential case 60 of the differential device 6.

With the power transmission device 1, the output rotation of the motor 2 is inputted to the hollow shaft 50 via the transmission mechanism 3. The rotation inputted to the hollow shaft 50 is inputted to the counter gear 5 via the large diameter gear 52 engaged with the gear part 502 of the hollow shaft 50.

With the counter gear 5, the large diameter gear 52 and the parking gear 53 are spline fitted to the outer circumference of the hollow shaft part 51, and the small diameter gear part 511 is integrally formed with the hollow shaft part 51.

For that reason, when the output rotation of the motor 2 is inputted to the counter gear 5, the parking gear 53 and the small diameter gear part 511 rotate around the axis line X1 together with the large diameter gear 52.

Having done that, the final gear FG engaged with the small diameter gear part 511 to be able to transmit rotation is fixed to the differential case 60, so the differential case 60 rotates around the rotation axis X in conjunction with the rotation of the counter gear 5 around the axis line X1.

Figure 4:
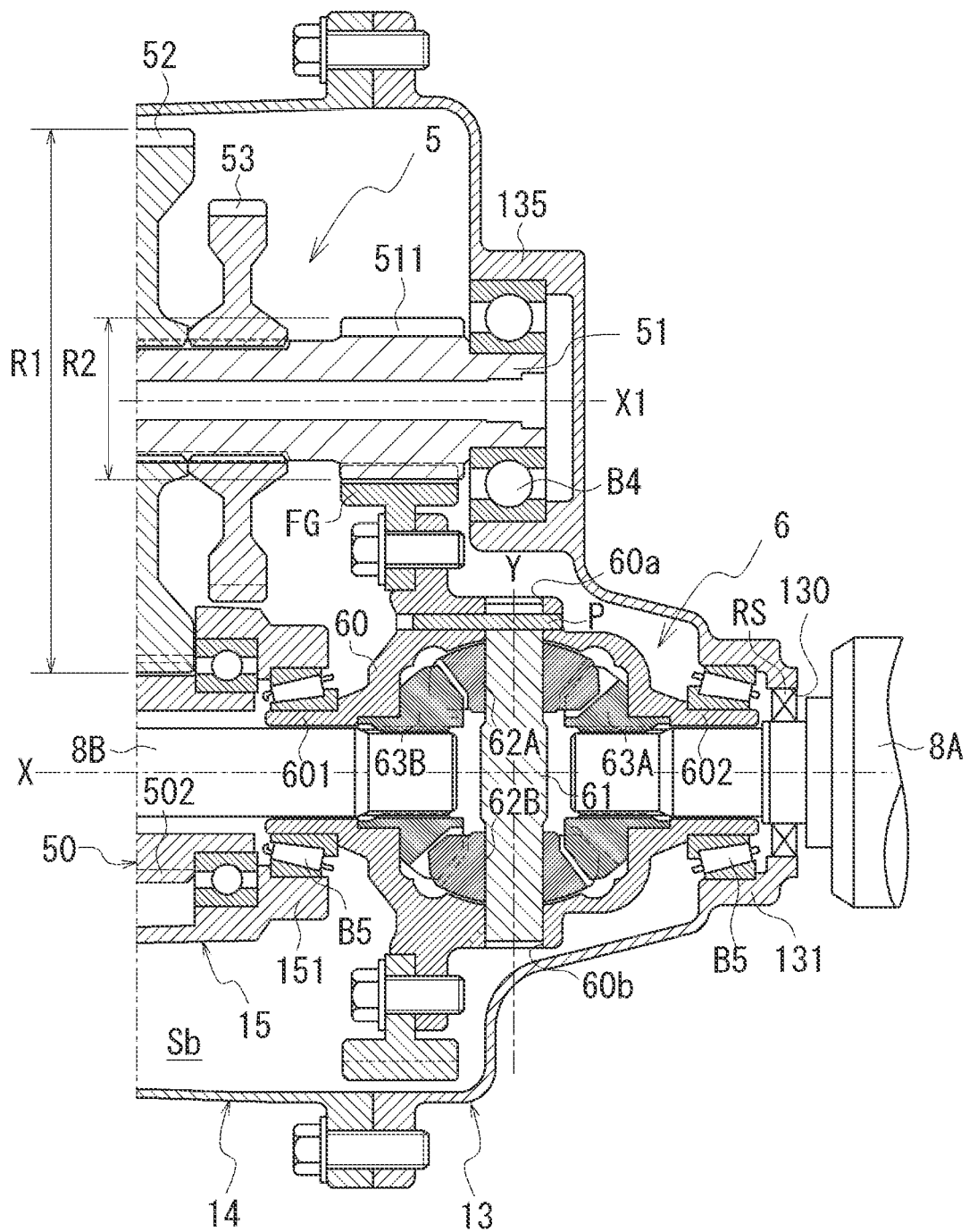
FIG. 4 is an enlarged view around a differential device of the power transmission device.

Here, with the counter gear 5, the outer diameter R2 of the small diameter gear part 511 is smaller than the outer diameter R1 of the large diameter gear part 52 (see FIG. 4).

Also, with the counter gear 5, the large diameter gear 52 serves as the input unit of the rotation transmitted from the motor 2 side, and the small diameter gear part 511 serves as the output unit of the transmitted rotation.

Having done that, the rotation inputted to the counter gear 5, after being significantly reduced, is outputted to the differential case 60.

FIG. 4 is an enlarged view around the differential device 6 of the power transmission device 1.

As shown in FIG. 4, the differential case 60 is formed to have a hollow shape that internally houses the shaft 61, bevel gears 62A, 62B, and side gears 63A, 63B.

With the differential case 60, cylindrical support units 601, 602 are provided at both sides in the rotation axis X direction (lateral direction in the drawing). The support units 601, 602 extend along the rotation axis X in the direction away from the shaft 61.

A bearing B5 is externally fitted on the support unit 602 of the differential case 60. The bearing B5 that is externally fitted on the support unit 602 is held by a ring shaped first support unit 131 of the outer case 13.

The drive shaft 8A that penetrates an opening 130 of the outer case 13 is inserted from the rotation axis X direction in the support unit 602, and the drive shaft 8A is supported to be able to rotate by the support unit 602.

The lip seal RS is fixed to the inner circumference of the opening 130, and by a lip section (not illustrated) of the lip seal RS being elastically in contact with the outer circumference of the drive shaft 8A, the gap between the outer circumference of the drive shaft 8A and the inner circumference of the opening 130 is sealed.

The bearing B5 is externally fitted on the support unit 601 of the differential case 60.

As shown in FIG. 1, the support unit 601 of the differential case 60 is supported to be able to rotate on the support unit 151 of a support member 15 fixed to the inner case 14 via the bearing B5.

The bearing B5 that is externally fitted on the support unit 601 is held by the ring shaped support unit 151 of the support member 15.

As shown in FIG. 1, the support member 15 has a cylindrical part 152 extending to the motor 2 side (left side in the drawing) from the outer circumference of the support unit 151, and a flange part 153 that surrounds the opening of the tip side of the cylindrical part 152 across the entire circumference. The flange part 153 of the support member 15 is fixed to the first support unit 141 of the inner case 14 by a bolt B that penetrates the flange part 153.

The support unit 601 of the differential case 60 is supported to be able to rotate by the support member 15 via the bearing B5. With the present embodiment, the support member 15 is fixed to the inner case 14. For that reason, the support unit 601 of the differential case 60 is supported by the inner case 14 which is a fixed side member with the bearing B5 and the support member 15 interposed.

The drive shaft 8B that penetrates an opening 114 of the outer cover 11 is inserted in the support unit 601 of the differential case 60 from the rotation axis X direction.

The drive shaft 8B is provided crossing the motor shaft 20 of the motor 2, the planetary gear set 4, and the inner diameter side of the hollow shaft 50 in the rotation axis X direction, and the tip side of the drive shaft 8B is supported to be able to rotate by the support unit 601.

The lip seal RS is fixed to the inner circumference of the opening 114 of the outer cover 11, and the gap between the outer circumference of the drive shaft 8B and the inner circumference of the opening 114 is sealed by the lip part (not illustrated) of the lip seal RS being elastically in contact with the outer circumference of the drive shaft 8B.

As shown in FIG. 4, in the interior of the differential case 60, the side gears 63A, 63B are spline fitted at the outer circumference of the tip part of the drive shafts 8 (8A, 8B), and the side gears 63A, 63B and the drive shafts 8 (8A, 8B) are linked to be able to rotate integrally around the rotation axis X.

Shaft holes 60a, 60b penetrating the differential case 60 in the direction orthogonal to the rotation axis X are provided at symmetrical positions sandwiching the rotation axis X.

The shaft holes 60a, 60b are positioned on the axis line Y that is orthogonal to the rotation axis X, and the shaft 61 is inserted in the shaft holes 60a, 60b.

The shaft 61 is fixed to the differential case 60 by a pin P, and the shaft 61 is prohibited from auto-rotating around the axis line Y.

The shaft 61 is positioned between the side gears 63A, 63B inside the differential case 60, and arranged along the axis line Y.

The bevel gears 62A, 62B are externally fitted on the shaft 61 inside the differential case 60 and supported to be able to rotate.

Two bevel gears 62A, 62B are provided with a gap opened in the longitudinal direction of the shaft 61 (axis line Y direction), and the bevel gears 62A, 62B are arranged in a state so that their teeth face each other.

In the shaft 61, the bevel gears 62A, 62B are provided with the shaft center of the bevel gears 62A, 62B matched to the shaft center of the shaft 61.

Inside the differential case 60, the side gears 63A, 63B are positioned at both sides of the bevel gears 62A, 62B in the rotation axis X direction.

Two side gears 63A, 63B are provided with a gap open in the rotation axis X direction in a state so that their teeth face each other, and the bevel gears 62A, 62B and the side gears 63A, 63B are assembled in a state with the teeth mutually engaged.

The action of the power transmission device 1 of this configuration is explained.

As shown in FIG. 1, with the power transmission device 1, the transmission mechanism 3, the counter gear 5, the differential device 6, and the drive shafts 8 (8A, 8B) are provided along the transmission route of the output rotation of the motor 2.

As shown in FIG. 2, when the rotor core 21 rotates around the rotation axis X by the driving of the motor 2, the rotation is inputted to the transmission mechanism 3 via the motor shaft 20 that rotates integrally with the rotor core 21.

With the transmission mechanism 3, the ring gear 42 of the planetary gear set 4 serves as the input unit, and the carrier 45 as the output unit of the inputted rotation.

Also, with the transmission mechanism 3, the low gear level is realized in the state with the band brake 49 operating, and the high gear level in the state with the clutch 47 operating.

For that reason, the rotation inputted to the transmission mechanism 3 is outputted to the hollow shaft 50 from the linking part 453 of the carrier 45 after the gear shift. Then, the rotation inputted to the hollow shaft 50 is inputted to the counter gear 5 via the large diameter gear 52 that is engaged with the gear part 502 of the hollow shaft 50.

With the counter gear 5, the large diameter gear 52 that engages with the gear part 502 of the hollow shaft 50 serves as the input unit of the output rotation of the motor 2, and the small diameter gear part 511 that engages with the final gear FG of the differential case 60 serves as the output unit of the inputted rotation.

Here, with the counter gear 5, the outer diameter R2 of the small diameter gear part 511 is smaller than the outer diameter R1 of the large diameter gear part 52 (see FIG. 4).

For that reason, the rotation inputted to the counter gear 5 is significantly reduced, after which it is outputted to the differential case 60 (differential device 6) via the final gear FG with which the small diameter gear part 511 engages.

By the differential case 60 rotating around the rotation axis X by the inputted rotation, the drive shafts 8 (8A, 8B) rotate around the rotation axis X. As a result, the output rotation of the motor 2 is transmitted to the left and right drive wheels (not illustrated) of the vehicle in which the power transmission device 1 is mounted.

Here, with the power transmission device 1, the actuator ACT of the band brake 49 is provided in the region that is the region Rx of the outer diameter side of the outer circumference wall 147 that surrounds the outer circumference of the transmission mechanism 3 with a prescribed gap, that overlaps the side wall 143 in the rotation axis X direction (see FIG. 2).

With the inner case 14, the region of the side wall 143 that houses the counter gear 5 overhangs facing radially outward of the rotation axis X. For that reason, with the outer diameter side of the outer circumference wall 147, viewing from the rotation axis X direction, there is a spatial margin in the region Rx overlapping the side wall 143.

With the power transmission device 1 of the present embodiment, by providing the actuator ACT of the band brake 49 using this region Rx, it is not necessary to have an increase in size of the body case 9 of the power transmission device 1.

Also, with the power transmission device 1, the motor shaft 20 of the rotor core 21, the counter gear 5, and the drive shafts 8 (8A, 8B) are arranged in series on the transmission route of the output rotation of the motor 2.

Also, the drive shaft 8B is provided penetrating the inner diameter side of the motor shaft 20 in the rotation axis X direction, and the drive shaft 8B and the motor shaft 20 are provided to be able to rotate relatively on a common rotation axis X.

For that reason, compared to the power transmission device in which the motor shaft, the counter gear, and the drive shaft are provided on different rotation axes that are parallel to each other, specifically, a so-called three-axis type power transmission device, it is possible to keep down the size of the radial direction of the rotation axis.

As described above, the power transmission device 1 of the first embodiment has the following configuration.

(1) The power transmission device 1 has:
the motor 2,
the transmission mechanism 3 connected downstream of the motor 2,
the counter gear 5 (reduction gear) arranged downstream of the transmission mechanism 3, and
the body case 9 (case member) that houses the motor 2, the transmission mechanism 3, and the counter gear 5.
The transmission mechanism 3 has the band brake 49, and the actuator ACT that drives the band brake 49.
The body case 9 (case member) has
the outer circumference wall 147 that surrounds the radial outer circumference of the transmission mechanism 3, and
a side wall 143 that is linked to the outer circumference wall 147, and that extends facing radially outward from the outer circumference wall 147.
The actuator ACT is adjacent to the outer circumference wall 147, and adjacent to the side wall 143.
With the inner case 14 of the body case 9, there is a spatial margin in the region Rx that is at the outer diameter side of the outer diameter wall 147, and that overlaps with the side wall 143 when viewed from the rotation axis X direction.
This region Rx is positioned at the outside of the region in which the outer circumference wall 147 and the side wall 143 in the inner case 14 are connected in substantially an L shape cross section, and the region Rx in the body case 9 is available space between the outer circumference wall 147 and the side wall 143, and the inner cover 12.
With the power transmission device 1, the actuator ACT is arranged in the available space outside the body case 9, so it is possible to provide the actuator ACT for which the actuator ACT in the power transmission device 1 does not enlarge the power transmission device 1 in the rotation axis X direction and the radial direction.

The power transmission device 1 of the first embodiment has the following configuration.
(2) In the rotation axis X direction of the motor 2, the side wall 143 is arranged sandwiched between the actuator ACT and the counter gear 5 (reduction gear).
The side wall 143, the actuator ACT, and the counter gear 5 overlap in the rotation axis X direction of the motor 2, and when viewed from the rotation axis X direction, the side wall 143, the actuator ACT, and the counter gear 5 are provided in an overlapping positional relationship.
As shown in FIG. 2, when the rotation axis (axis line X1) of the counter gear 5 is arranged radially outward of the rotation axis X of the motor 2, in parallel to the rotation axis X, there is a spatial margin in the region Rx adjacent to the counter gear 5 in the axis line X1 direction.
For that reason, when the actuator ACT is placed in the region Rx, the side wall 143 of the inner case 14 is positioned between the actuator ACT and the counter gear 5.
By placing the actuator ACT in this region Rx, it is possible to suitably prevent an increase in size of the power transmission device 1 in the rotation axis X direction and the radial direction.

The power transmission device 1 of the first embodiment has the following configuration.
(3) The band brake 49 and the actuator ACT are arranged adjacent to the outer circumference wall 147 in the radial direction of the rotation axis X of the motor 2, sandwiching the outer circumference wall 147.
The band brake 49, the actuator ACT, and the outer circumference wall 147 overlap in the radial direction of the rotation axis X, and when viewed from the radial direction of the rotation axis X, the band brake 49, the actuator ACT, and the outer circumference wall 147 are provided in an overlapping positional relationship.

As shown in FIG. 2, when the rotation axis (axis line X1) of the counter gear 5 is arranged radially outward of the rotation axis X of the motor 2, in parallel to the rotation axis X, there is a spatial margin in the region Rx adjacent to the counter gear 5 radially outward of the outer circumference wall 147.

By arranging the actuator ACT in this region Rx, the actuator ACT is positioned close to the band brake 49, so it is possible to shorten the distance between the band brake 49 and the actuator ACT, and to make the physical build of the actuator ACT smaller.

Second Embodiment

Next, a second embodiment of the present embodiment is explained.

In the explanation hereafter, parts in common with the first embodiment noted above are marked by the same code numbers, and an explanation is omitted to the extent possible.

Figure 5:
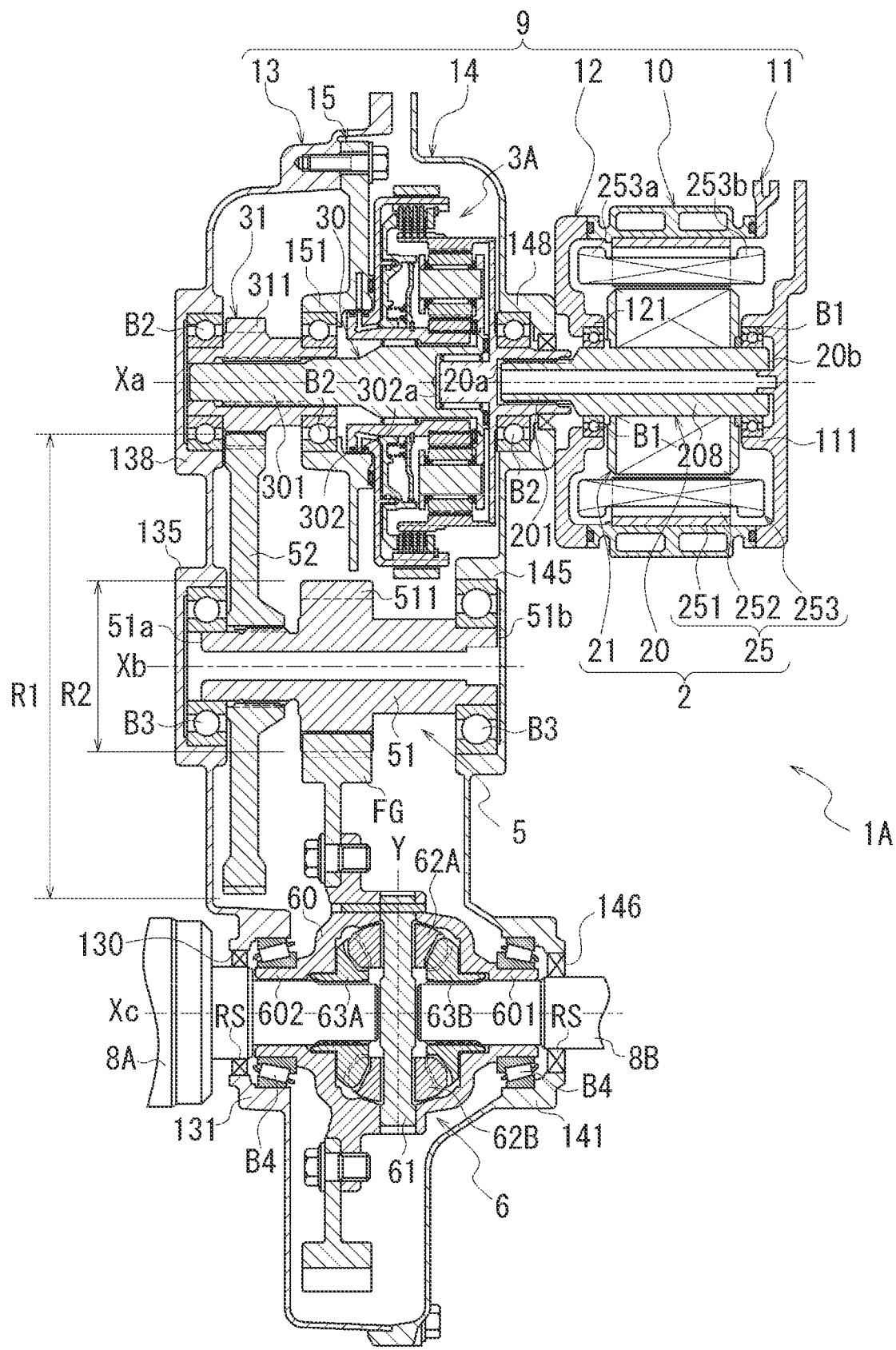
FIG. 5 is a drawing for explaining the power transmission device of a second embodiment.

FIG. 5 is a drawing for explaining a power transmission device 1A of the second embodiment.

Figure 6:
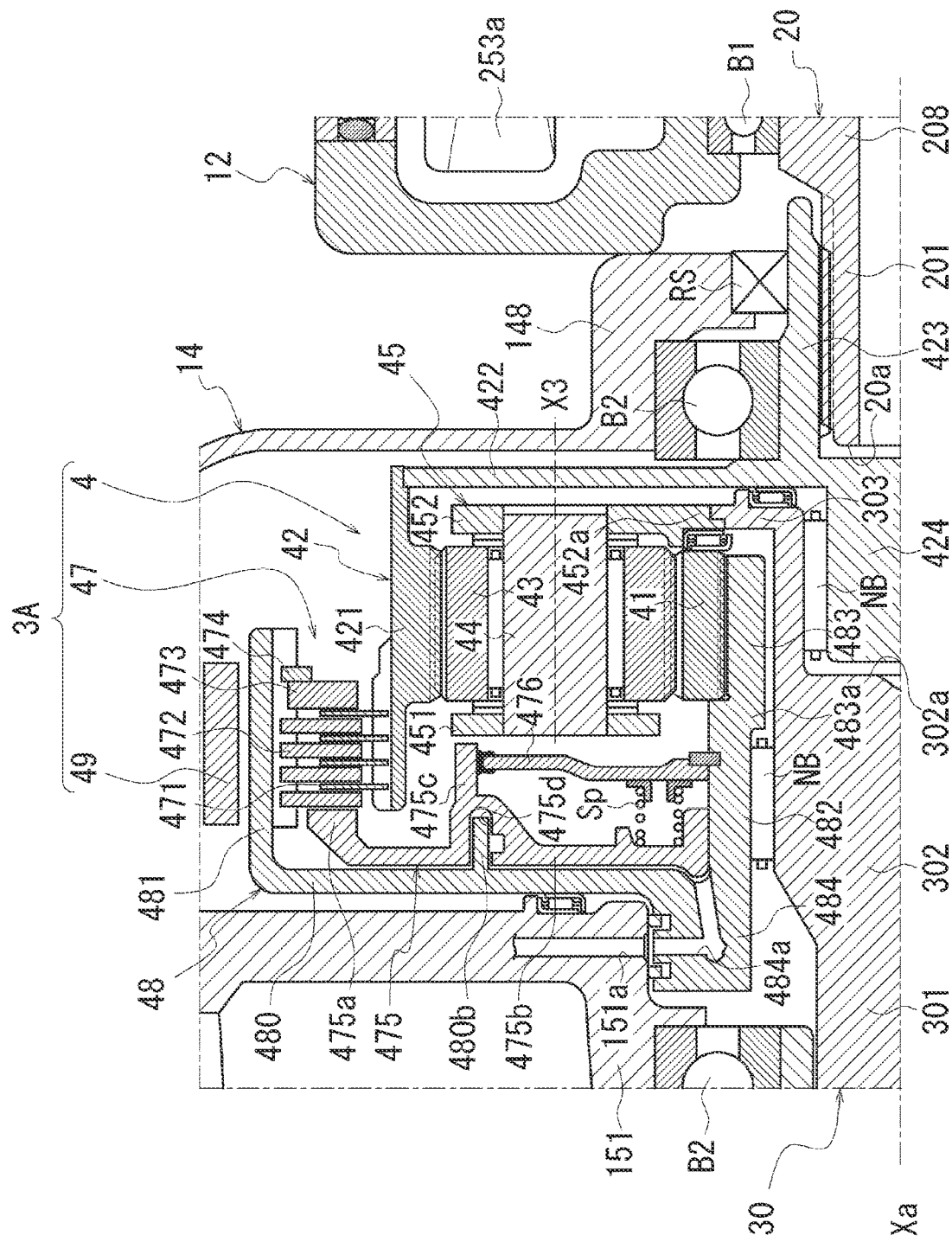
FIG. 6 is a drawing for explaining the transmission mechanism of the power transmission device of the second embodiment.

FIG. 6 is an enlarged view around a transmission mechanism 3A of the power transmission device 1A.

Figure 7:
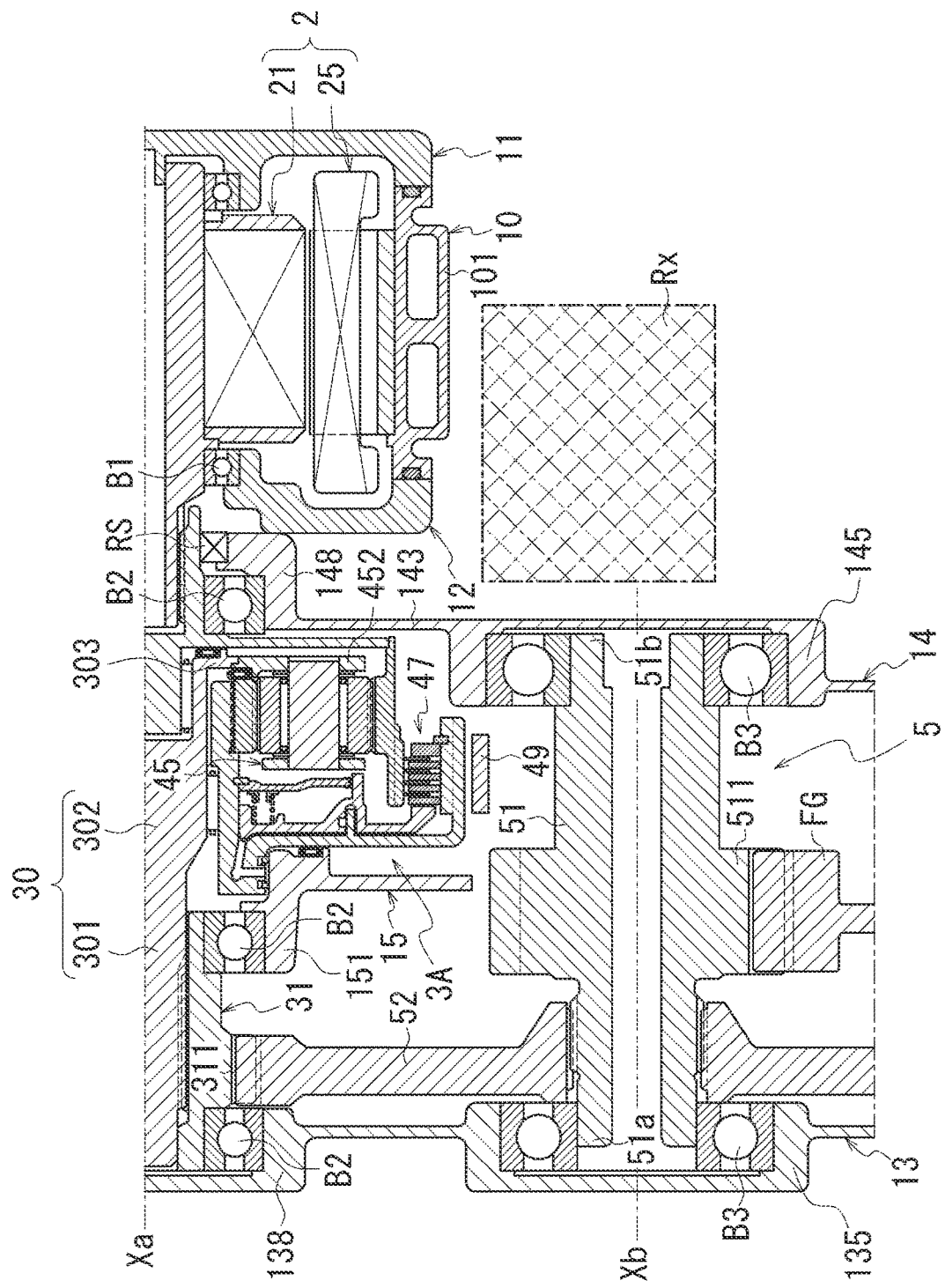
FIG. 7 is a drawing for explaining the power transmission device of the second embodiment.

FIG. 7 is a drawing for explaining the region Rx in which the actuator ACT of the power transmission device 1A is arranged.

As shown in FIG. 5, the power transmission device 1A has the motor 2, the transmission mechanism 3A, the counter gear 5 that transmits the output rotation of the transmission mechanism 3A to the differential device 6, and the differential device 6 that transmits the transmitted rotation to drive shafts 8 (8A, 8B).

With the power transmission device 1A, the transmission mechanism 3A, the counter gear 5, the differential device 6, and the drive shafts 8 (8A, 8B) are provided along the transmission route of the output rotation of the motor 2.

After being shifted by the transmission mechanism 3A, the output rotation of the motor 2 is reduced by the counter gear 5, and transmitted to the differential device 6. With the differential device 6, the transmitted rotation is transmitted via the drive shafts 8 (8A, 8B) to drive wheels (not illustrated) at left and right of a vehicle in which the power transmission device 1A is mounted.

Here, the transmission mechanism 3A is connected downstream of the motor 2, the counter gear 5 is connected downstream of the transmission mechanism 3A, the differential device 6 is connected downstream of the counter gear 5, and the drive shafts 8 (8A, 8B) are connected downstream of the differential device 6.

With the power transmission device 1A, the motor 2 and the transmission mechanism 3A are arranged coaxially on a common rotation axis Xa. A rotation axis Xb of the counter gear 5, and a rotation axis Xc of the differential device 6 and the drive shafts 8 (8A, 8B) are provided in parallel to the rotation axis Xa at the radially outward side of the rotation axis Xa.

The power transmission device 1A is a so-called three-axis power transmission device in which rotation axes Xa, Xb, and Xc which are involved in transmitting rotation are arranged to be parallel to each other.

In the power transmission device 1A of the second embodiment as well, the body case 9 of the power transmission device 1A is constituted by the motor housing 10, the outer cover 11, the inner cover 12, the outer case 13, and the inner case 14.

The case (first case member) of the motor 2 is constituted by the motor housing 10, the outer cover 11, and the inner cover 12.

The case (second case member) that houses the transmission mechanism 3A, the counter gear 5, and the differential device 6 is constituted by the outer case 13 and the inner case 14.

The motor 2 has: the cylindrical motor shaft 20; the cylindrical rotor core 21 externally fitted on the motor shaft 20; and the stator core 25 that surrounds the outer circumference of the rotor core 21 with a prescribed gap.

With the motor shaft 20, bearings B1, B1 are externally fitted on both sides of the rotor core 21. The motor shaft 20 is supported to be able to rotate on the motor support unit 111 of the outer cover 11, and the motor support unit 121 of the inner cover 12 via the bearings B1, B1.

As shown in FIG. 6, the linking part 201 for which the outer diameter is smaller than the large diameter part 208 of the other end 20b side is provided at the one end 20a side of the motor shaft 20.

The linking part 201 of the motor shaft 20 is spline fitted to the inner circumference of the linking part 423 of the transmission mechanism 3A side inside a ring shaped third support unit 148 of the inner case 14.

The transmission mechanism 3A has a planetary gear set 4, a clutch 47, and a band brake 49.

The planetary gear set 4 has a sun gear 41, a ring gear 42, a pinion gear 43, a pinion shaft 44, and a carrier 45.

The constitutional elements of the planetary gear set 4 (sun gear 41, ring gear 42, pinion gear 43, pinion shaft 44, carrier 45) are provided on the inner diameter side of the outer wall part 481 of the clutch drum 48.

The clutch 47 has: the drive plate 471 (inner diameter side friction plate) spline fitted to the outer circumference of the ring gear 42; the driven plate 472 (outer diameter side friction plate) spline fitted to the inner circumference of the outer wall part 481 of the clutch drum 48; and the piston 475 provided to be able to move in the rotation axis Xa direction.

The clutch drum 48 has the outer wall part 481, the disk part 480, the inner wall part 482, and the linking part 483.

The outer wall part 481 has a cylindrical shape that surrounds the rotation axis Xa with a prescribed gap. The disk part 480 extends to the inner diameter side from the end part of the outer wall part 481 on the side opposite to the motor 2 (left side in the drawing). The inner wall part 482 is provided at the end part of the inner diameter side of the disk part 480.

The inner wall part 482 is formed in a cylinder shape that surrounds the rotation axis Xa with a prescribed gap. The inner wall part 482 extends to the planetary gear set 4 side (right side in the drawing) from the end part of the inner diameter side of the disk part 480, and the tip of the inner wall part 482 is positioned at the inner diameter side of the band brake 49.

The linking part 483 has a cylindrical shape that surrounds the rotation axis Xa with a prescribed gap. With the linking part 483, the base end part 483a in the longitudinal direction is linked to the inner circumference of the tip side of the inner wall part 482.

The linking part 483 extends in a straight line in the direction approaching the motor 2 (rightward in the drawing).

The clutch drum 48 consisting of the outer wall part 481, the disk part 480, the inner wall part 482, and the linking part 483 has an opening provided facing the motor 2 side.

The inner circumference of the inner wall part 482 is supported by the outer circumference of a support shaft 30 with the needle bearing NB interposed.

As shown in FIG. 5, the support shaft 30 is a shaft-like member for which a small diameter part 301 and a large diameter part 302 are integrally formed aligned in the rotation axis Xa direction, and is arranged facing along the rotation axis Xa.

The support shaft 30 is arranged coaxially with the motor shaft 20. As shown in FIG. 6, with the large diameter part 302 positioned at the motor 2 side (right side in the drawing) in the support shaft 30, a containment hole 302a in which the motor shaft 20 can be received is opened at the part facing the motor shaft 20.

A shaft 424 provided at the tip of the motor shaft 20 is inserted in the containment hole 302a. The needle bearing NB externally fitted on the shaft 424 is in contact on the inner circumference of the containment hole 302a, and the support shaft 30 and the motor shaft 20 are engaged to be able to rotate relatively at the containment hole 302a part.

A disk shaped flange part 303 is integrally formed with the tip part of the motor 2 side of the large diameter part 302. The flange part 303 is provided facing orthogonally to the rotation axis Xa, and the outer circumference of the flange part 303 extends to the side of the linking part 483 of the clutch drum 48.

The sun gear 41 of the planetary gear set 4 is spline fitted to the outer circumference of the linking part 483.

With the planetary gear set 4, the ring gear 42 is positioned at the outer diameter side of the sun gear 41. The ring gear 42 has: the peripheral wall part 421 that surrounds the outer circumference of the sun gear 41 with a prescribed gap; the disk part 422 that extends to the inner diameter side from the end part of the motor 2 side of the peripheral wall part 421; the linking part 423 that extends to the motor 2 side from the end part of the inner diameter side of the disk part 422; and the shaft 424 that extends from the end part of the inner diameter side of the disk part 422 to the side opposite the motor 2.

With the peripheral wall part 421 positioned further to the outer diameter side than the shaft 424, the outer circumference of the pinion gear 43 engages with the inner circumference of the area positioned at the outer diameter side of the sun gear 41.

The pinion gear 43 engages with the inner circumference of the peripheral wall part 421 of the ring gear 42 side, and the outer circumference of the sun gear 41.

The pinion shaft 44 that supports the pinion gear 43 is provided facing along the axis line X3 that is parallel to the rotation axis Xa of the motor 2. One end and the other end of the pinion shaft 44 are supported by the pair of side plates 451, 452 that constitute the carrier 45.

The side plates 451, 452 are provided in parallel to each other with a gap open in the axis line X3 direction.

One side plate 452 positioned at the motor 2 side extends more to the rotation axis X side than the other side plate 451. The end part 452a of the inner diameter side of the side plate 452 is linked to the outer circumference of the flange part 303 of the support shaft 30 side.

The peripheral wall part 421 of the ring gear 42 has a ring shape that surrounds the rotation axis Xa with a prescribed gap, and the drive plate 471 of the clutch 47 is spline fitted to the outer circumference of the peripheral wall part 421.

The driven plate 472 of the clutch 47 is spline fitted to the inner circumference of the outer wall part 481 of the clutch drum 48.

The drive plate 471 and the driven plate 472 are provided alternately between the peripheral wall part 421 of the ring gear 42 and the outer wall part 481 of the clutch drum 48.

The retaining plate 473 positioned by the snap ring 474 is positioned at the motor 2 side of an area in which the drive plate 471 and the driven plate 472 are alternately provided, and the pressing unit 475a of the piston 475 is positioned at the side opposite the motor 2.

The piston 475 has the base 475b provided facing orthogonally to the rotation axis Xa. At substantially the center of the base 475b in the radial direction of the rotation axis Xa, a cylindrical wall part 475c extending to the planetary gear set 4 side (right side in the drawing) is provided.

At the base 475b of the piston 475, in the area in which the cylindrical wall part 475c is provided, a slit 475d recessed in the direction away from the disk part 480 of the clutch drum 480 (rightward in the drawing) is provided.

A guide piece 480b extending to the motor 2 side from the disk part 480 of the clutch drum 48 is inserted in the slit 475d.

The spring Sp supported by the spring retainer 476 is pressure welded from the rotation axis X direction on the surface of the motor 2 side of the base 475b in the area more to the inner diameter side than the cylindrical wall part 475c in the base 475b.

The piston 475 is energized to the disk part 480 side (left side in the drawing) of the clutch drum 48 by the energizing force acting from the spring Sp.

With the clutch drum 48, at the boundary of the disk part 480 and the inner wall part 482, the projection 484 that projects to the side opposite the motor 2 is provided. The projection 484 is inserted in the inner circumference of the support unit 151 of the bearing B2. A supply channel 151a of oil OL is opened in the inner circumference of the support unit 151.

In the interior of the projection 484, provided is the oil passage 484a for guiding the oil OL supplied from the support unit 151 side to the oil chamber between the disk part 480 of the clutch drum 48 and the base 475b of the piston 475.

The oil OL supplied to the oil chamber via the oil passage 484a displaces the piston 475 to the motor 2 side (right side in the drawing). At this time, the displacement of the piston 475 in the rotation axis Xa direction is guided by the guide piece 480b provided in the disk part 480, and the slit 475d of the piston 475 side in which the guide piece 480b is inserted.

When the piston 475 is displaced to the motor 2 side, the drive plate 471 and the driven plate 472 of the clutch 47 are gripped between the pressing unit 475a of the piston 475 and the retaining plate 473.

By doing this, the relative rotation of the ring gear 42 to which the drive plate 471 is spline fitted, and the clutch drum 48 to which the driven plate 472 is spline fitted is regulated according to the pressure of the supplied oil OL, and finally the relative rotation is regulated.

Furthermore, the band brake 49 is wound around the outer circumference of the outer wall part 481 of the clutch drum 48. When the winding radius of the band brake 49 is narrowed by the actuator (not illustrated), the rotation of the clutch drum 48 around the rotation axis Xa is regulated.

As shown in FIG. 7, the motor housing 10 that houses the motor 2 has the disk shaped peripheral wall part 101.

Viewed from the rotation axis Xa direction, the peripheral wall part 101 is provided at a position overlapping the clutch 47 of the transmission mechanism 3A, and the peripheral wall part 101 and the clutch 47 are provided in a positional relationship overlapping in the rotation axis Xa direction.

With the inner cover 12 that closes the opening of the motor housing 10, the region of the rotation axis Xa side (top side in the drawing) is joined to a third support part 148 of the inner case 14 from the rotation axis Xa side.

The side wall 143 of the inner case 14 is positioned between the transmission mechanism 3A and the motor 2 (inner cover 12). The side wall 143 is provided oriented orthogonally to the rotation axis Xa, and is provided with a gap open with the inner cover 12 in the rotation axis Xa direction.

With the side wall 143, the cylindrical second support unit 145 is provided at the inner circumference of the region of the outer diameter side with the rotation axis Xa of the transmission mechanism 3A as a reference.

The second support unit 145 extends to the outer case 13 side from the surface facing the outer case 13 (left side surface in the drawing) in the side surface 143.

With the side wall 143 of the inner case 14, the range from the region positioned at the side of the transmission mechanism 3A to the region in which the second support unit 145 is provided is provided oriented orthogonally to the rotation axis Xa and the rotation axis Xb.

The actuator ACT of the band brake 49 is provided in the region that is the region Rx at the outer diameter side of the peripheral wall part 101 of the motor housing 10, that overlaps the side wall 143 in the rotation axis Xa and Xb directions.

Viewed from the rotation axis Xa and Xb directions, the region in which the actuator ACT is provided is in a positional relationship overlapping the side wall 143.

As shown in FIG. 6, with the transmission mechanism 3A, the planetary gear set 4, and the clutch 47 are positioned at the inner diameter side of the band brake 49. The band brake 49, the planetary gear set 4, and the clutch 47 overlap in the radial direction of the rotation axis X, and when viewed from radially outward of the rotation axis X, the band brake 49, the planetary gear set 4, and the clutch 47 are provided in an overlapping positional relationship.

With the transmission mechanism 3A of the present embodiment, the ring gear 42 of the planetary gear set 4 serves as the input unit of the outputted rotation of the motor 2, and the carrier 45 as the output unit of the inputted rotation.

With the transmission mechanism 3A, low gear level is realized with the following condition (a), and high gear level is realized with condition (b).

(a) Band brake 49: Operated, Clutch 47: Released
(b) Band brake 49: Not operated, Clutch 47: Engaged Here, the transmission mechanism 3A is a two-level transmission mechanism, where low gear level and high gear level are in the same rotational direction (forward level or reverse level). Switching of forward and reverse is possible by forward/reverse rotation of the motor 2.

Specifically, with the transmission mechanism 3A, when the rotation of the clutch drum 48 is regulated by operation of the band brake 49, the low gear level is realized. When the clutch 47 is engaged, and the ring gear 42 and the clutch drum 48 are linked without being able to rotate relatively, high gear level is realized.

The output rotation of the motor 2 is outputted to the support shaft 30 from the side plate 452 of the carrier 45 after being shifted by the transmission mechanism 3A.

As shown in FIG. 5 and FIG. 7, the support shaft 30 extends in the direction away from the motor 2 along the rotation axis Xa. With the support shaft 30, a hollow shaft 31 is spline fitted to the outer circumference of the small diameter part 301.

With the hollow shaft 31, bearings B2, B2 are externally fitted at both sides in the rotation axis Xa direction.

The hollow shaft 31 is supported by a third support unit 138 of the outer case 13 side, and the support unit 151 of the support member 15 with the bearings B2, B2 interposed. For that reason, the support shaft 30 is supported by the third support unit 138 of the outer case 13 side, and the third support unit 148 of the inner case 14 side with the hollow shaft 31 interposed.

With the hollow shaft 31, a gear part 311 is integrally formed with the outer circumference of the area between the bearings B2, B2.

The large diameter gear 52 of the counter gear 5 is engaged with the ability to transmit rotation to the outer circumference of the gear part 311. In the counter gear 5, the large diameter gear 52 is spline fitted to the outer circumference of the cylindrical hollow shaft part 51.

Bearings B3, B3 are externally fitted at the one end part 51a and the other end part 51b in the longitudinal direction of the hollow shaft part 51.

The one end part 51a of the hollow shaft part 51 is supported to be able to rotate with the second support unit 135 of the outer case 13 via the bearing B3.

The other end part 51b of the hollow shaft part 51 is supported to be able to rotate with the second support unit 145 of the inner case 14 via the bearing B3.

In this state, the hollow shaft part 51 of the counter gear 5 is provided along the rotation axis Xb parallel to the rotation axis Xa.

With the hollow shaft part 51, the small diameter gear part 511 is provided adjacent to the other end part 51b side (right side in the drawing) when viewed from the large diameter gear 52. The small diameter gear part 511 is formed integrally with the hollow shaft part 51, and is formed with the outer diameter R2 smaller than the outer diameter R1 of the large diameter gear 52 (see FIG. 5: R1>R2).

As shown in FIG. 5, the small diameter gear part 511 is engaged with the ability to transmit rotation to the final gear FG fixed to the differential case 60 of the differential device 6.

With the differential case 60, cylindrical support units 601, 602 are provided at both sides in the rotation axis Xc direction (lateral direction in the drawing). The support units 601, 602 extend along the rotation axis Xc parallel to the rotation axis Xa.

Bearings B4, B4 are externally fitted on the support units 601, 602 of the differential case 60.

The support unit 602 is held by the ring shaped first support unit 131 of the outer case 13 with the bearing B4 interposed.

The support unit 602 is held by the ring shaped first support unit 141 of the inner case 14 with the bearing B4 interposed.

The drive shaft 8B that penetrates an opening 146 of the inner case 14 is inserted from the rotation axis Xc direction in the support unit 601 of the differential case 60.

The drive shaft 8A that penetrates the opening 130 of the outer case 13 is inserted from the rotation axis Xc direction in the support unit 602 of the differential case 60.

In the interior of the differential case 60, the side gears 63A, 63B are spline fitted at the outer circumference of the tip part of the drive shafts 8 (8A, 8B).

In the interior of the differential case 60, the column shaped shaft 61 is provided along axis line Y orthogonal to the rotation axis Xc, and the side gears 63A, 63B face the rotation axis Xc direction with the shaft 61 sandwiched between.

The bevel gears 62A, 62B are externally fitted on the shaft 61 and supported to be able to rotate.

Two bevel gears 62A, 62B are provided with a gap opened in the longitudinal direction of the shaft 61 (axial direction of the axis line Y), and the bevel gears 62A, 62B are arranged in a state so that their teeth face each other.

Inside the differential case 60, the side gears 63A, 63B are positioned at both sides of the bevel gears 62A, 62B in the rotation axis X direction, and the bevel gears 62A, 62B and the side gears 63A, 63B are assembled in a state with the teeth mutually engaged.

The action of the power transmission device 1A of this configuration is explained.

As shown in FIG. 5, with the power transmission device 1A, the transmission mechanism 3A, the counter gear 5, the differential device 6, and the drive shafts 8 (8A, 8B) are provided along the transmission route of the output rotation of the motor 2.

When the rotor core 21 rotates around the rotation axis Xa by the driving of the motor 2, the rotation is inputted to the transmission mechanism 3A via the motor shaft 20 that rotates integrally with the rotor core 21.

With the transmission mechanism 3A, the ring gear 42 of the planetary gear set 4 serves as the input unit, and the carrier 45 as the output unit of the inputted rotation (see FIG. 6).

With the transmission mechanism 3A, the low gear level is realized in the state with the band brake 49 operating, and the high gear level with the state with the clutch 47 operating (engaged state).

For that reason, the rotation inputted to the transmission mechanism 3A is outputted to the hollow shaft 50 from the linking part 453 of the carrier 45 after shifting. Then, the rotation inputted to the hollow shaft 50 is inputted to the counter gear 5 via the large diameter gear 52 engaged with the gear part 311 of the hollow shaft 50.

With the counter gear 5, the outer diameter R2 of the small diameter gear part 511 is smaller than the outer diameter R1 of the large diameter gear part 52 (see FIG. 5).

For that reason, the rotation inputted to the counter gear 5 is significantly reduced, after which it is outputted to the differential case 60 (differential device 6) via the final gear FG with which the small diameter gear part 511 engages.

Also, by the differential case 60 rotating around the rotation axis Xc by the inputted rotation, the drive shafts 8 (8A, 8B) rotate around the rotation axis Xc. As a result, the output rotation of the motor 2 is transmitted to the left and right drive wheels (not illustrated) of the vehicle in which the power transmission device 1A is mounted.

The power transmission device 1A is a so-called three-axis power transmission device in which rotation axes Xa, Xb, and Xc which are involved in transmitting rotation are arranged to be parallel to each other.

As shown in FIG. 7, the actuator ACT of the transmission mechanism 3A is provided in the region that is the region Rx of the outer diameter side of the peripheral wall part 101 of the motor housing 10, that overlaps the side wall 143 of the inner case 14 when viewed from the rotation axis Xa direction of the motor 2.

With the body case 9 of the three-axis type power transmission device 1A, the first case member (motor housing 10, outer cover 11, inner cover 12) part that houses the motor 2 overhangs facing outward of the rotation axis Xa direction of the motor 2 from the second case member (outer case 13, inner case 14) that houses the differential device 6. For that reason, at the outer diameter side of the peripheral wall part 101 of the motor housing 10, there is a spatial margin in the region Rx overlapping the side wall 143 of the inner case 14 when viewing from the rotation axis Xa direction.

With the power transmission device 1A of the present embodiment, by providing the actuator ACT of the band brake 49 using this region Rx, it is not necessary to have an increase in size of the power transmission device 1A in the rotation axis Xa direction.

As described above, the power transmission device 1A of the second embodiment has the following configuration.

(4) The power transmission device 1A has:
the motor 2,
the transmission mechanism 3A connected downstream of the motor 2,
the counter gear 5 (reduction gear) arranged downstream of the transmission mechanism 3A, and
the case member that houses the motor 2, the transmission mechanism 3A, and the counter gear 5.

The transmission mechanism 3A has the band brake 49, and the actuator ACT that drives the band brake 49.

The body case 9 (case member) of the power transmission device 1A has:
the peripheral wall part 101 (outer circumference wall) that surrounds the radial outer circumference of the motor 2, and
the side wall 143 that links the peripheral wall part 101 and the inner cover 12, and that extends facing radially outside of the rotation axis Xa when viewing from the peripheral wall part 101.

The actuator ACT is adjacent to the peripheral wall part 101 and adjacent to the side wall 143.

With the inner case 14 of the body case 9, there is a spatial margin in the region Rx that is at the outer diameter side of the peripheral wall part 101, and that overlaps with the side wall 143 when viewed from the rotation axis Xa direction.

This region Rx is positioned at the outside of a region in which the side wall 143 in the inner case 14 and the peripheral wall part 101 are connected in substantially an L shape cross section, the region Rx in the body case 9 being available space between the peripheral wall part 101 and the side wall 143.

With the power transmission device 1A, the actuator ACT is arranged in the available space of the body case 9 outer part, so it is possible to provide the actuator ACT that does not enlarge the power transmission device 1A in the rotation axis Xa direction.

The power transmission device 1A of the second embodiment has the following configuration.

(5) With the power transmission device 1A, the band brake 49 and the actuator ACT are arranged adjacent to the side wall 143 sandwiching the side wall 143 in the rotation axis Xa direction (axial direction) of the motor 2.

The band brake 49, the actuator ACT, and the side wall 143 overlap in the rotation axis Xa direction of the motor, and when viewing from the rotation axis Xa direction, the band brake 49, the actuator ACT, and the side wall 143 are provided in an overlapping positional relationship.

As shown in FIG. 7, when the rotation axis Xb of the counter gear 5 is arranged radially outward of the rotation axis Xa of the motor 2, in parallel to the rotation axis Xa, there is a spatial margin in the region Rx adjacent to the counter gear 5, which is the region Rx radially outside the peripheral wall part 101 (outer circumference wall) that surrounds the outer circumference of the motor 2.

For that reason, when the actuator ACT is placed in the region Rx, the side wall 143 is positioned between the actuator ACT and the motor 2.

By arranging the actuator ACT in this region Rx, it is possible to suitably prevent an increase in size of the power transmission device 1A in the rotation axis X direction and the radial direction.

Third Embodiment

Next, a third embodiment of the present embodiment is explained.

In the explanation hereafter, parts in common with the first embodiment and the second embodiment noted above are marked by the same code numbers, and an explanation is omitted to the extent possible.

Figure 8:
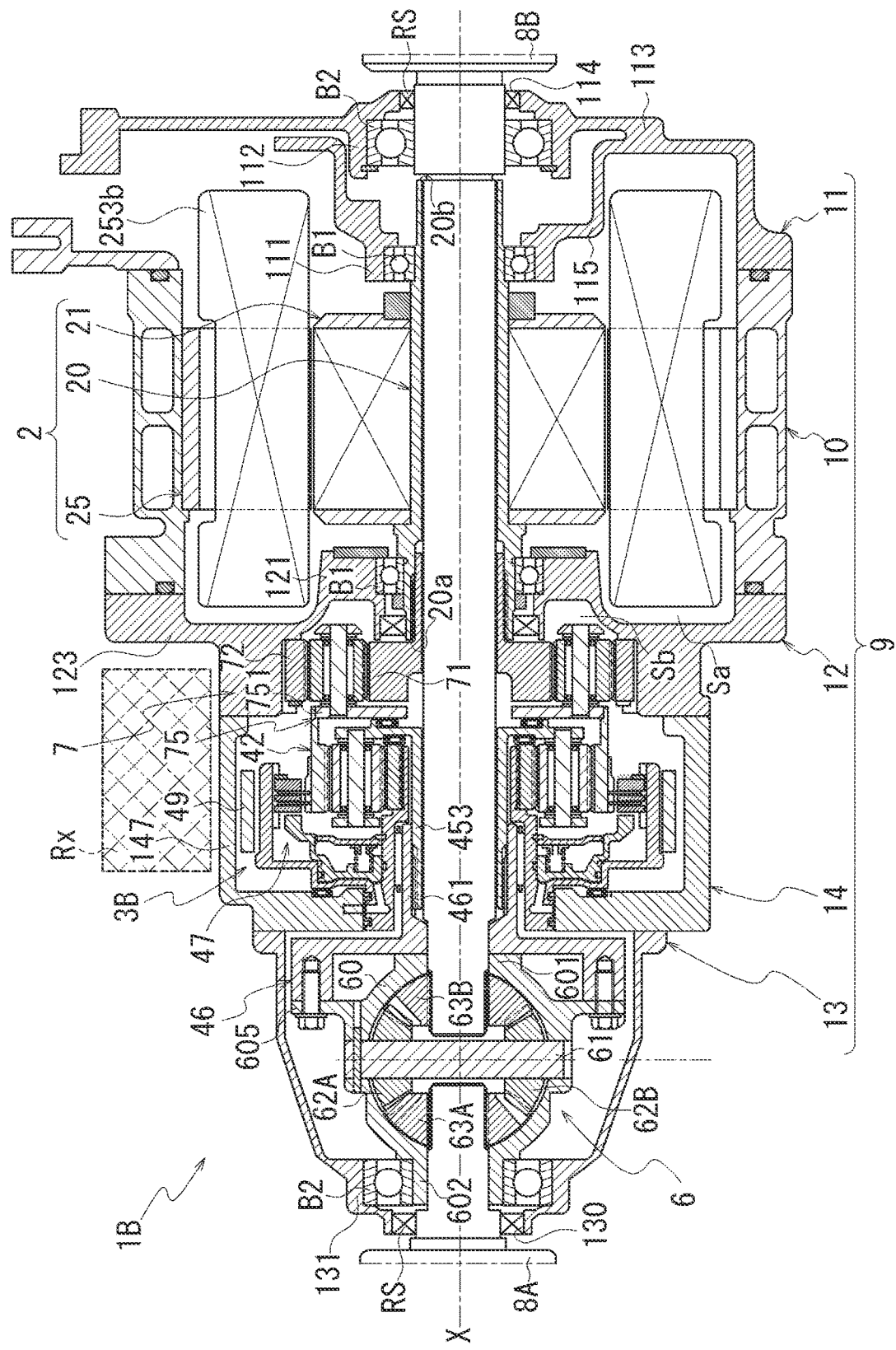
FIG. 8 is a drawing for explaining the power transmission device of a third embodiment.

FIG. 8 is a drawing for explaining a power transmission device 1B of the third embodiment.

Figure 9:
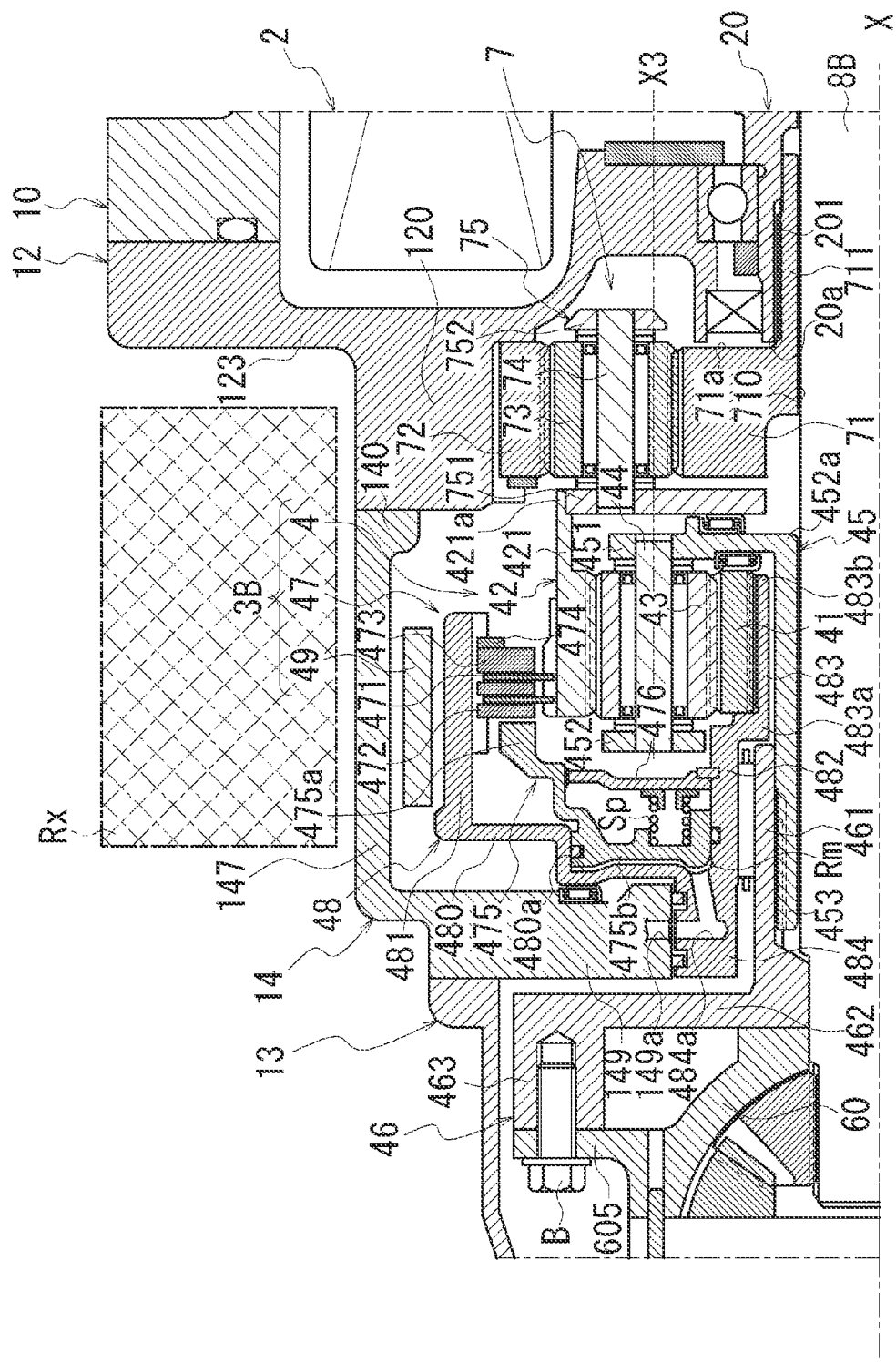
FIG. 9 is an enlarged view around the transmission mechanism of the power transmission device of the third embodiment.

FIG. 9 is an enlarged view around a transmission mechanism 3B of the power transmission device 1B.

As shown in FIG. 8, with the power transmission device 1B, a planetary reduction gear 7, the transmission mechanism 3B, the differential device 6, and the drive shafts 8 (8A, 8B) are provided along the transmission route of the output rotation of the motor 2.

After being shifted by the planetary reduction gear 7, the output rotation of the motor 2 is inputted to the transmission mechanism 3B. The transmission mechanism 3B shifts the inputted rotation and transmits it to the differential device 6. With the differential device 6, the transmitted rotation is transmitted via the drive shafts 8 (8A, 8B) to drive wheels (not illustrated) at left and right of a vehicle in which the power transmission device 1B is mounted.

Here, the planetary reduction gear 7 is connected downstream of the motor 2, the transmission mechanism 3B is connected downstream of the planetary reduction gear 7, the differential device 6 is connected downstream of the transmission mechanism 3B, and the drive shafts 8 (8A, 8B) are connected downstream of the differential device 6.

The power transmission device 1B is a so-called one-axis type power transmission device in which the motor 2, the planetary reduction gear 7, the transmission mechanism 3B, the differential device 6, and the drive shafts 8 (8A, 8B) are arranged coaxially on a common rotation axis X.

In the power transmission device 1B of the third embodiment as well, the body case 9 of the power transmission device 1B is constituted by the motor housing 10, the outer cover 11, the inner cover 12, the outer case 13, and the inner case 14.

The case (first case member) of the motor 2 is constituted by the motor housing 10, the outer cover 11, and the inner cover 12.

The case (second case member) that houses the planetary reduction gear 7, the transmission mechanism 3B, and the differential device 6 is constituted by the outer case 13 and the inner case 14.

As shown in FIG. 8, the motor 2 has: a cylindrical motor shaft 20; a cylindrical rotor core 21 externally fitted on the motor shaft 20; and a stator core 25 that surrounds the outer circumference of the rotor core 21 with a prescribed gap.

With the motor shaft 20, bearings B1, B1 are externally fitted on both sides of the rotor core 21. The motor shaft 20 is supported to be able to rotate on the motor support unit 111 of the outer cover 11, and the motor support unit 121 of the inner cover 12 via the bearings B1, B1.

As shown in FIG. 9, the linking part 201 of the one end 20a side of the motor shaft 20 is spline fitted to the outer circumference of a linking part 711 of the planetary reduction gear 7 side.

The planetary reduction gear 7 has a sun gear 71, a ring gear 72, a pinion gear 73, a pinion shaft 74, and a carrier 75.

The sun gear 71 has the linking part 711 extending in the rotation axis X direction from the inner diameter side of a side surface 71a. The linking part 711 is formed integrally with the sun gear 71, and a through hole 710 is formed straddling the inner diameter side of the sun gear 71 and the inner diameter side of the linking part 711.

The sun gear 71 is supported to be able to rotate at the outer circumference of the drive shaft 8B penetrating the through hole 710.

The ring gear 72 fixed to the inner circumference of the ring shaped junction part 120 of the inner cover 12 is positioned at the outer diameter side of the sun gear 71 in the radial direction of the rotation axis X. In the radial direction of the rotation axis X, between the sun gear 71 and the ring gear 72, the pinion gear 73 supported to be able to rotate with the pinion shaft 74 is engaged with the inner circumference of the ring gear 72.

One end and the other end in the lengthwise direction of the pinion shaft 74 are supported by a pair of side plates 751, 752 that constitute the carrier 75.

The side plates 751, 752 are provided in parallel to each other with a gap open in the rotation axis X direction.

Between the side plates 751, 752, the plurality of pinion gears 73 are provided in a plurality (four, for example) at a prescribed interval in the circumferential direction around the rotation axis X.

With the planetary reduction gear 7, the sun gear 71 serves as the input unit of the outputted rotation of the motor 2, and the carrier 75 as the output unit of the inputted rotation.

With the carrier 75 that is the rotation output unit, the ring gear 42 of the transmission mechanism 3B side is linked to the outer circumference of the side plate 751.

The transmission mechanism 3B has a planetary gear set 4, a clutch 47, and a band brake 49.

The planetary gear set 4 has a sun gear 41, a ring gear 42, a pinion gear 43, a pinion shaft 44, and a carrier 45.

The constitutional elements of the planetary gear set 4 (sun gear 41, ring gear 42, pinion gear 43, pinion shaft 44, carrier 45) are provided on the inner diameter side of the outer wall part 481 of the clutch drum 48.

The clutch 47 has: the drive plate 471 (inner diameter side friction plate) spline fitted to the outer circumference of the ring gear 42; the driven plate 472 (outer diameter side friction plate) spline fitted to the inner circumference of the outer wall part 481 of the clutch drum 48; and the piston 475 provided to be able to move in the rotation axis X direction.

The clutch drum 48 has the outer wall part 481, the disk part 480, the inner wall part 482, and the linking part 483.

The outer wall part 481 has a cylindrical shape that surrounds the rotation axis X with a prescribed gap. The disk part 480 extends to the inner diameter side from the end part of the outer wall part 481 on the side opposite to the motor 2 (left side in the drawing). The region of the inner diameter side of the disk part 480 is the recess 480a recessed in the direction away from the planetary gear set 4.

The inner wall part 482 is formed in a cylinder shape that surrounds the rotation axis X with a prescribed gap. The inner wall part 482 extends to the planetary gear set 4 side (left side in the drawing) from the end part of the inner diameter side of the disk part 480, and the tip of the inner wall part 482 faces the meshing portion of the sun gear 41 and the pinion gear 43 with a gap open in the rotation axis X direction.

The linking part 483 has a cylindrical shape that surrounds the rotation axis X with a prescribed gap. With the linking part 483, the base end part 483a in the longitudinal direction is linked to the inner circumference of the tip side of the inner wall part 482.

The linking part 483 extends in a straight line in the direction approaching the motor 2 (leftward in the drawing). A tip 483b of the linking part 483 is positioned further to the motor 2 side than the outer wall part 481.

The clutch drum 48 consisting of the outer wall part 481, the disk part 480, the inner wall part 482, and the linking part 483 has an opening provided facing the motor 2 side, and the sun gear 41 of the planetary gear set 4 is spline fitted to the outer circumference of the linking part 483 positioned on the inner diameter side.

With the planetary gear set 4, the ring gear 42 is positioned at the outer diameter side of the sun gear 41. The ring gear 42 has: a peripheral wall part 421 that surrounds the outer circumference of the sun gear 41 with a prescribed gap, and the end part 421a of the motor 2 side of the peripheral wall part 421 is linked to the side plate 751 of the carrier 75 of the planetary reduction gear 7.

With the peripheral wall part 421, the outer circumference of the pinion gear 43 engages with the inner circumference of the area positioned at the outer diameter side of the sun gear 41.

The pinion gear 43 engages with the inner circumference of the peripheral wall part 421 of the ring gear 42, and the outer circumference of the sun gear 41.

The pinion shaft 44 that supports the pinion gear 43 is provided facing along axis line X3 that is parallel to the rotation axis X. One end and the other end of the pinion shaft 44 are supported by a pair of side plates 451, 452 that constitute the carrier 45.

The side plates 451, 452 are provided in parallel to each other with a gap open in the axis line X3 direction.

One side plate 452 positioned at the motor 2 side extends more to the rotation axis X side than the other side plate 451. A cylindrical linking part 453 that surrounds the rotation axis X with a prescribed gap is integrally formed with an end part 452a of the inner diameter side of the side plate 452.

The linking part 453 extends on the rotation axis X side (inner diameter side) of the linking part 483 of the clutch 48 in the direction away from the motor 2 along the rotation axis X (leftward in the drawing).

The linking part 453 is provided crossing the inner diameter side of the sun gear 41 from the motor 2 side to the differential device 6 side, and the linking part 453 is spline fitted to the inner circumference of a linking part 461 of a rotation transmission member 46 at the inner diameter side of the inner wall part 482 of the clutch drum 48.

The driven plate 472 of the clutch 47 is spline fitted to the inner circumference of the outer wall part 481 of the clutch drum 48. The drive plate 471 of the clutch 47 is spline fitted to the outer circumference of the peripheral wall part 421 of the ring gear 42.

The drive plate 471 and the driven plate 472 are provided alternately between the peripheral wall part 421 of the ring gear 42 and the outer wall part 481 of the clutch drum 48.

The retaining plate 473 positioned by the snap ring 474 is positioned at the motor 2 side of an area in which the drive plate 471 and the driven plate 472 are alternately provided, and the pressing unit 475a of the piston 475 is positioned at the differential device 6 side.

The base 475b of the inner diameter side of the piston 475 is provided at a position farther from the planetary gear set 4 than the pressing unit 475a on the outer diameter side (left side position in the drawing). The base 475b of the inner diameter side of the piston 475 is internally fitted in the recess 480a of the inner diameter side of the disk part 480 adjacent in the rotation axis X direction.

The spring Sp supported by the spring retainer 476 is pressure welded from the rotation axis X direction on the surface of the motor 2 side (left side in the drawing) of the base 475b.

The piston 475 is energized to the differential device 6 side by the energizing force acting from the spring Sp.

With the clutch drum 48, at the boundary of the recess 480a and the inner wall part 482, a projection 484 that projects to the differential device 6 side is provided.

The projection 484 is inserted in the inner circumference of a support unit 149 provided in the inner case 14. A supply channel 149a of the oil OL is opened in the inner circumference of the first support unit 141.

With the projection 484, the oil passage 484a is opened at the outer circumference of the area facing the supply channel 149a. The oil passage 484a is provided for guiding the oil OL supplied from the supply channel 149a to an oil pressure chamber Rm inside the clutch drum 48.

The oil pressure chamber Rm is formed between the recess 480a of the clutch drum 48 and the base 475b of the piston 475.

When the oil OL is supplied to the oil pressure chamber Rm, the piston 475 is pressed by the oil pressure inside the oil pressure chamber Rm and displaced to the motor 2 side (right side in the drawing).

When the piston 475 is displaced to the motor 2 side, the drive plate 471 and the driven plate 472 of the clutch 47 are gripped between the pressing unit 475a of the piston 475 and the retaining plate 473.

By doing this, the relative rotation of the ring gear 42 to which the drive plate 471 is spline fitted, and the clutch drum 48 to which the driven plate 472 is spline fitted is regulated according to the pressure of the supplied oil OL, and finally the relative rotation is regulated.

Furthermore, the band brake 49 is wound around the outer circumference of the outer wall part 481 of the clutch drum 48. When the winding radius of the band brake 49 is narrowed by the actuator ACT (not illustrated), the rotation of the clutch drum 48 around the rotation axis X is regulated.

The inner case 14 that houses the transmission mechanism 3B has the outer circumference wall 147 that surrounds the outer circumference of the transmission mechanism 3B with a prescribed gap. The inner case 14 has the junction part 140 of the inner cover 12 side provided joined to the junction part 120 of the inner cover 12 from the rotation axis X direction.

With the inner cover 12, there is a side wall 123 extending radially outward of the rotation axis X from the outer circumference of the junction part 120.

The actuator ACT of the band brake 49 is provided in the region that is the region Rx of the outer diameter side of the outer circumference wall 147, and that overlaps with the side wall 123 in the rotation axis X direction.

Viewing from the rotation axis X direction, the region Rx in which the actuator ACT is provided has a positional relationship overlapping the side wall 123.

With the transmission mechanism 3B, the planetary gear set 4, and the clutch 47 are positioned at the inner diameter side of the band brake 49. The band brake 49, the planetary gear set 4, and the clutch 47 overlap in the radial direction of the rotation axis X, and when viewed from radially outward of the rotation axis X, the band brake 49, the planetary gear set 4, and the clutch 47 are provided in an overlapping positional relationship.

With the transmission mechanism 3B of the present embodiment, the ring gear 42 of the planetary gear set 4 serves as the input unit of the outputted rotation of the motor 2, and the carrier 45 as the output unit of the inputted rotation.

With the transmission mechanism 3B, the specification is that switching between the low gear level and the high gear level is performed by changing the combination of the engagement/release of the clutch 47, and the operation of the band brake 49.

The transmission mechanism 3B is able to switch between the low gear level and the high gear level.

With the transmission mechanism 3B, low gear level is realized with the following condition (a), and high gear level is realized with condition (b).

(a) Band brake 49: Operated, Clutch 47: Released
(b) Band brake 49: Not operated, Clutch 47: Engaged Here, the transmission mechanism 3B is a two-level transmission mechanism, where low gear level and high gear level are in the same rotational direction (forward level or reverse level). Switching of forward and reverse is possible by forward/reverse rotation of the motor 2.

The rotation inputted to the transmission mechanism 3B, after being shifted by the transmission mechanism 3B, is outputted to the rotation transmission member 46 to which the linking part 453 of the carrier 45 is linked.

The rotation transmission member 46 has the linking part 461 that is spline fitted to the outer circumference of the linking part 453 of the carrier 45, a disk part 462 that extends to the outer diameter side from the end part of the differential device 6 side of the linking part 461, and a cylindrical part 463 that extends to the differential device 6 side from the outer circumference side of the disk part 462.

The cylindrical part 463 abuts a linking piece 605 integrally formed with the differential case 6 from the rotation axis X direction, and the cylindrical part 463 is linked to the differential case 60 by the bolt B penetrating the linking piece 605.

As shown in FIG. 8, the differential case 60 is formed to have a hollow shape that internally houses the shaft 61, bevel gears 62A, 62B, and side gears 63A, 63B.

With the differential case 60, cylindrical support units 601, 602 are provided at both sides in the rotation axis X direction (lateral direction in the drawing). The support units 601, 602 extend along the rotation axis X in the direction away from the shaft 61.

The support unit 602 of the differential case 60 is supported to be able to rotate with the first ring shaped support part 131 of the outer case 13 with the bearing B2 interposed.

The drive shaft 8A that penetrates the opening 130 of the outer case 13 is inserted from the rotation axis X direction in the support unit 602, and the drive shaft 8A is supported to be able to rotate by the support unit 602.

The lip seal RS is fixed to the inner circumference of the opening 130, and by a lip section (not illustrated) of the lip seal RS being elastically in contact with the outer circumference of the drive shaft 8A, the gap between the outer circumference of the drive shaft 8A and the inner circumference of the opening 130 is sealed.

The drive shaft 8B that penetrates the opening 114 of the outer cover 11 is inserted in the support unit 601 from the rotation axis direction.

The drive shaft 8B is provided crossing the motor shaft 20 of the motor 2, the sun gear 71 of the planetary reduction gear 7, and the inner diameter side of the transmission mechanism 3B in the rotation axis X direction, and the tip side of the drive shaft 8B is supported to be able to rotate by the support unit 601.

The lip seal RS is fixed to the inner circumference of the opening 114 of the outer cover 11, and the gap between the outer circumference of the drive shaft 8B and the inner circumference of the opening 114 is sealed by the lip part (not illustrated) of the lip seal RS being elastically in contact with the outer circumference of the drive shaft 8B.

In the interior of the differential case 60, the side gears 63A, 63B are spline fitted at the outer circumference of the tip part of the drive shafts 8A, 8B, and the side gears 63A, 63B are engaged to be able to transmit rotation to the bevel gears 62A, 62B.

The bevel gears 62A, 62B are externally fitted on the shaft 61 provided facing along the axis line Y orthogonal to the rotation axis X.

The action of the power transmission device 1B of this configuration is explained.

With the power transmission device 1B, the planetary reduction gear 7, the transmission mechanism 3B, the differential device 6, and the drive shafts 8 (8A, 8B) are provided along the transmission route of the output rotation of the motor 2.

The output rotation of the motor 2 is reduced by the planetary reduction gear 7, and inputted to the ring gear 42 of the transmission mechanism 3B.

With the transmission mechanism 3B, the ring gear 42 of the planetary gear set 4 serves as the input unit, and the carrier 45 that supports the pinion gear 43 as the output unit of the inputted rotation.

With the transmission mechanism 3B, the low gear level is realized in the state with the band brake 49 operating, and the high gear level in the state with the clutch 47 operating.

For that reason, the rotation inputted to the transmission mechanism 3B, after shifting, is inputted to the differential case 60 of the differential device 6 via the rotation transmission member 46 linked to the linking part 453 of the carrier 45.

By the differential case 60 rotating around the rotation axis X by the inputted rotation, the drive shafts 8 (8A, 8B) rotate around the rotation axis X. As a result, the output rotation of the motor 2 is transmitted to the left and right drive wheels (not illustrated) of the vehicle in which the power transmission device 1B is mounted.

Here, with the power transmission device 1B, the actuator ACT of the band brake 49 is provided in the region that is the region Rx of the outer diameter side of the outer circumference wall 147 that surrounds the outer circumference of the transmission mechanism 3B with a prescribed gap, and that overlaps the side wall 123 in the rotation axis X direction.

With the inner cover 12, the region of the side wall 123 that houses the motor 2 overhangs facing radially outward of the rotation axis X. For that reason, with the outer diameter side of the outer circumference wall 147, when viewing from the rotation axis X direction, there is a spatial margin in the region Rx overlapping the side wall 123.

With the power transmission device 1B of the present embodiment, by providing the actuator ACT of the band brake 49 using this region Rx, it is not necessary to have an increase in size of the body case 9 of the power transmission device 1B.

Also, with the power transmission device 1B, the motor shaft 20 of the rotor core 21, the planetary reduction gear 7, the transmission mechanism 3B, and the drive shafts 8 (8A, 8B) are arranged concentrically on the transmission route of the output rotation of the motor 2.

Also, the drive shaft 8B is provided penetrating the inner diameter side of the motor shaft 20 in the rotation axis X direction, and the drive shaft 8B and the motor shaft 20 are provided to be able to rotate relatively on a common rotation axis X.

For that reason, compared to the power transmission device in which the motor shaft, the counter gear, and the drive shaft are provided on different rotation axes that are parallel to each other, specifically, a so-called three-axis type power transmission device, it is possible to keep down the size of the radial direction of the rotation axis.

As described above, the power transmission device 1B of the third embodiment has the following configuration.

(6) The power transmission device 1B has:
the motor 2,
the transmission mechanism 3B connected downstream of the motor 2, and
the body case 9 (case member) that houses the motor 2 and the transmission mechanism 3B.

The transmission mechanism 3B has the band brake 49, and the actuator ACT that drives the band brake 49.

The body case 9 (case member) has:
the outer circumference wall 147 that surrounds the radial outer circumference of the transmission mechanism 3B, and
the side wall 123 that links with the outer circumference wall 147, and that extends facing radially outward from the outer circumference wall 147.

The actuator ACT is adjacent to the outer circumference wall 147 and adjacent to the side wall 123.

With the inner case 14 of the body case 9, there is a spatial margin in the region Rx that is at the outer diameter side of the outer circumference wall 147, and that overlaps with the side wall 123 when viewed from the rotation axis X direction.

This region Rx is positioned at the side of the region in which the outer circumference wall 147 in the inner case 14 and the side wall 123 in the inner cover 12 are connected in substantially an L shape cross section, and the region Rx in the body case 9 is a available space between the outer circumference wall 147, the side wall 123, and the outer case 13.

With the power transmission device 1B, the actuator ACT is arranged in the available space of the body case 9 outer part, so it is possible to provide the actuator ACT in the power transmission device 1B so that the actuator ACT does not enlarge the power transmission device 1B in the rotation axis X direction and the radial direction.

The power transmission device 1B of the third embodiment has the following configuration.

(7) In the rotation axis X direction of the motor 2, the side wall 123 is arranged sandwiched between the actuator ACT and the motor 2.

The side wall 123, the actuator ACT, and the motor 2 overlap in the rotation axis X direction of the motor 2, and when viewed from the rotation axis X direction, the side wall 123, the actuator ACT, and the motor 2 are provided in an overlapping positional relationship.

As shown in FIG. 9, when the outer diameter of the motor 2 is greater than the outer diameter of the transmission mechanism 3B, there is a spatial margin in the region Rx radially outward of the outer circumference wall 147 surrounding the outer circumference of the transmission mechanism 3B, the region Rx being adjacent to the motor 2 (stator core 25) in the rotation axis X direction.

For that reason, when the actuator ACT is placed in the region Rx, the side wall 123 of the inner cover 12 is positioned between the actuator ACT and the counter gear 5.

By placing the actuator ACT in this region Rx, it is possible to suitably prevent an increase in size of the power transmission device 1B in the rotation axis X direction and the radial direction.

The power transmission device 1B of the third embodiment has the following configuration.

(8) The band brake 49 and the actuator ACT are arranged adjacent to the outer circumference wall 147, sandwiching the outer circumference wall 147 in the radial direction of the rotation axis X of the motor 2.

The band brake 49, the actuator ACT, and the outer circumference wall 147 overlap in the radial direction of the rotation axis X, and when viewed from the radial direction of the rotation axis X, the band brake 49, the actuator ACT, and the outer circumference wall 147 are provided in an overlapping positional relationship.

As shown in FIG. 9, in a case when the motor 2 and the transmission mechanism 3B are provided coaxially, when the outer diameter of the motor 2 is greater than the outer diameter of the transmission mechanism 3B, there is a spatial margin in the region Rx adjacent to the motor 2 (stator core 25) radially outward of the outer circumference wall 147.

By arranging the actuator ACT in this region Rx, the actuator ACT is positioned close to the band brake 49, so it is possible to shorten the distance between the band brake 49 and the actuator ACT, and to make the physical build of the actuator ACT smaller.

Figure 10:
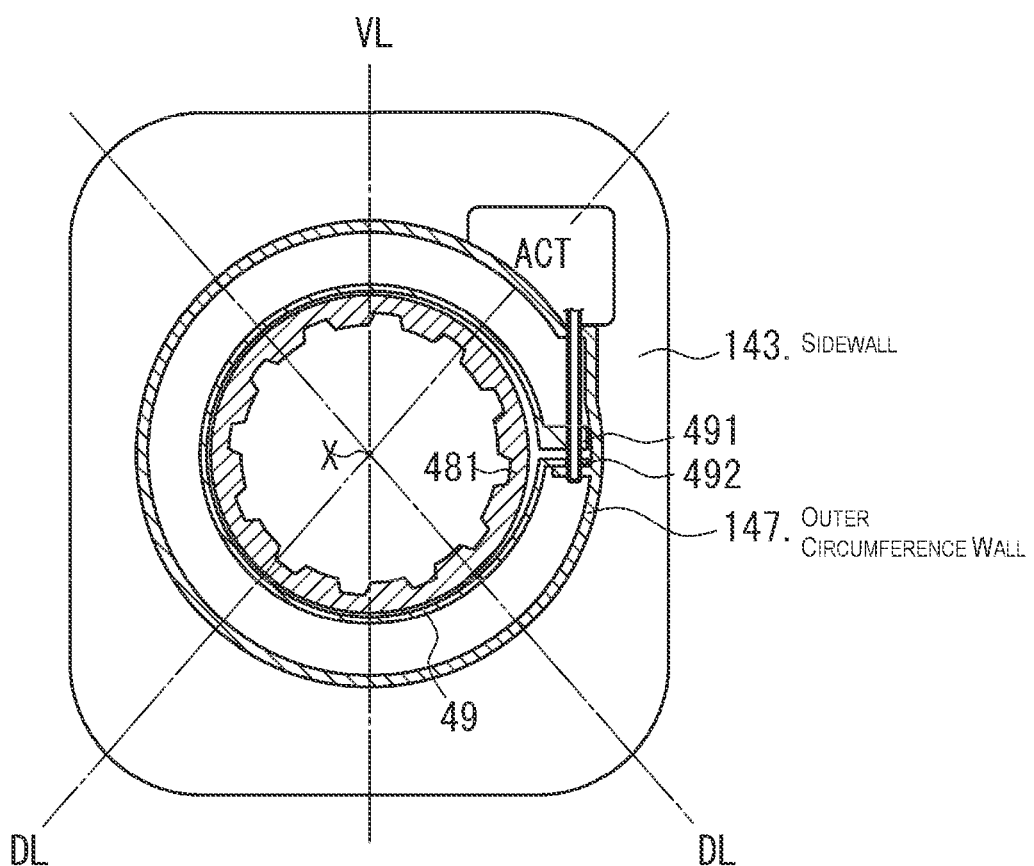
FIG. 10 is a drawing for explaining the positional relationship of the side wall and the outer circumference wall of the actuator.

FIG. 10 is a drawing for explaining the arrangement of the actuator ACT of the band brake 49, and is a drawing for explaining the positional relationship of the side wall and the outer circumference wall.

When viewing the power transmission device 1 of the first embodiment noted above from the rotation axis X direction, this can be schematically shown as in FIG. 10.

As shown in FIG. 10, the actuator ACT of the band brake 49 is arranged at the outside of the outer circumference wall 147 surrounding the radial outer circumference of the transmission mechanism 3, and at a position linked with the outer circumference 147, and adjacent to the side wall 143 extending facing radially outward from the outer circumference wall 147.

The actuator ACT overlaps the side wall 143 in the rotation axis X (axial direction), and when viewing from the rotation axis X direction, is provided in a positional relationship overlapping the side wall 143.

The actuator ACT is provided at a position offset from a vertical line VL that passes through the center in the width direction of the outer circumference wall 147 when viewed from the rotation axis X (axial direction), and does not overlap the vertical line VL.

For example, as shown in FIG. 10, the actuator is arranged between the outer circumference wall and one of the four corners of the side wall. In the case of FIG. 10, the actuator ACT is arranged at a position overlapping a diagonal line DL of the side wall 143 when viewed from the rotation axis X direction.

For example, in a case such as when the actuator is placed directly above the outer circumference wall, there is a risk that the top part of the actuator will stick out from the side wall and the overall device will become larger. By arranging in this way, the actuator is placed near the four corners which is a broad space, so it is possible to suppress an increase in size overall of the power transmission device 1.

In the case of the power transmission device 1A (see FIG. 5, FIG. 7) of the second embodiment, the peripheral wall part 101 that surrounds the radial outer circumference of the motor 2 correlates to the outer circumference wall in FIG. 10, the rotation axis Xa of the motor 2 correlates to the rotation axis X in FIG. 10, and the side wall 143 of the inner case 14 correlates to the side wall in FIG. 10.

In the case of the power transmission device 1B (see FIG. 8) of the third embodiment, the outer circumference wall 147 that surrounds the radial outer circumference of the transmission mechanism 3B correlates to the outer circumference wall in FIG. 10, the rotation axis X of the motor 2 correlates to the rotation axis X in FIG. 10, and the side wall 123 of the inner cover 12 correlates to the side wall in FIG. 10.

Figure 11:
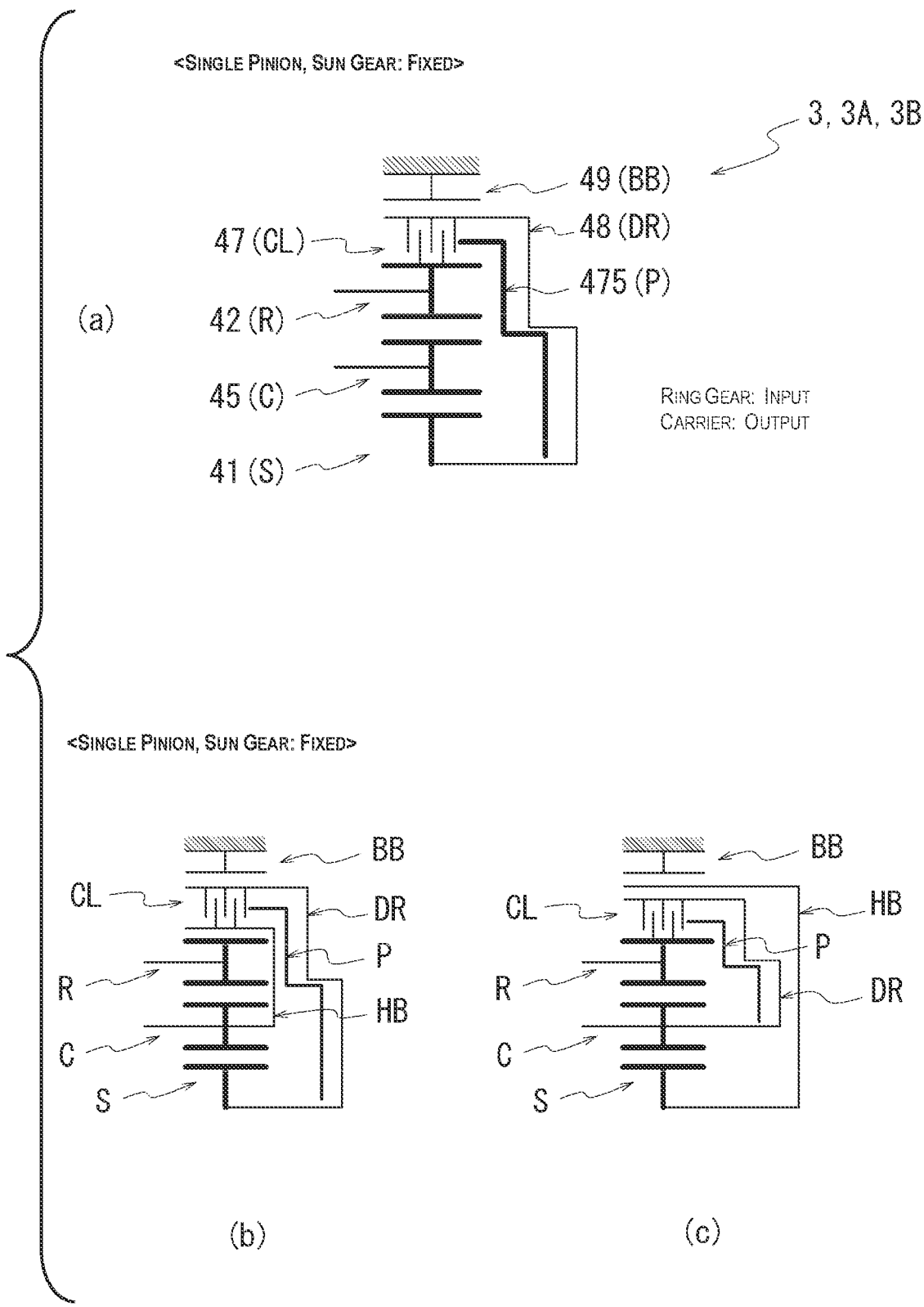
FIG. 11 is a skeleton diagram schematically showing the configuration of the transmission mechanism and the transmission mechanism of a modification example.

FIG. 11 is a skeleton diagram schematically showing the configuration of the transmission mechanisms 3, 3A, 3B.

Figure 14:
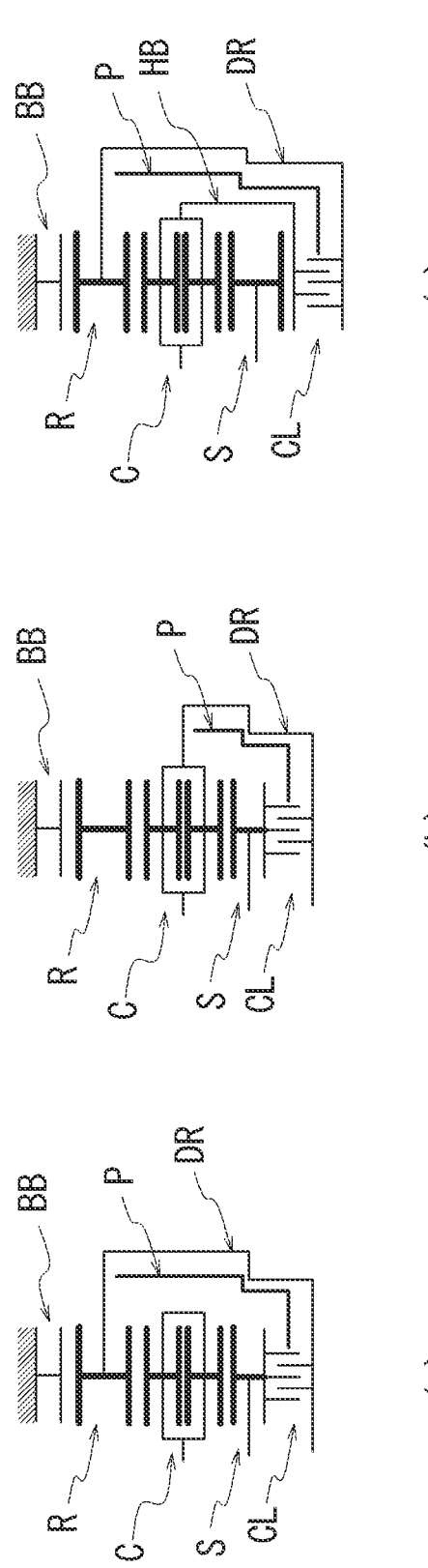
FIG. 14 is a skeleton diagram schematically showing the configuration of the transmission mechanism of a modification example.

FIG. 11 (*b*) to FIG. 14 are skeleton diagrams for explaining modification examples of the transmission mechanism.

With the explanation hereafter, code "S" means the sun gear 41 of the planetary gear 4, code "R" means the ring gear 42, and code "C" means the carrier 45.

Also, code "BB" means the band brake 49, code "CL" means the clutch 47, code "P" means the piston 475, code "DR" means the clutch drum 48, and code "HB" means the hub.

The transmission mechanisms 3, 3A, 3B noted above can be shown as in FIG. 11 (*a*).

With the transmission mechanisms 3, 3A, 3B noted above, examples were shown of cases when the planetary gear set 4 is a single pinion having one pinion gear 43.

With the transmission mechanisms 3, 3A, 3B, the ring gear 42 (R) of the planetary gear set 4 is the rotation input unit, and the carrier 45 is the output unit. Also, the clutch 47 (C), the ring gear 42 (R), and the sun gear (S) are engaged to not be able to rotate relatively, and the band brake 49 (BB) fixes the sun gear 41 (S) linked to the clutch drum 48 (DR).

The transmission mechanism to which the power transmission device of the invention of this case can be applied is not limited to only these modes.

Following, examples of modes of the transmission mechanism to which this can be applied are shown using FIG. 11 (*b*) to FIG. 14.

For example, when fixing the rotation of the sun gear S with the band brake BB with a single pinion, the modes shown in FIG. 11 (*b*), (*c*) are also possible.

With the mode in FIG. 11 (*b*), the ring gear R of the planetary gear set is the rotation input unit, the carrier C is the output unit, and the band brake BB fixes the sun gear S linked to the clutch drum DR. The clutch CL engages the sun gear S linked to the clutch drum DR, and the carrier C linked to the hub HB so they are not able to rotate relatively.

With the mode in FIG. 11 (*c*), the ring gear R of the planetary gear set is the rotation input unit, the carrier C is the output unit, and the band brake BB fixes the sun gear S linked to the hub HB. The clutch CL engages the ring gear R, and the carrier C linked to the clutch drum DR so they are not able to rotate relatively.

Figure 12:
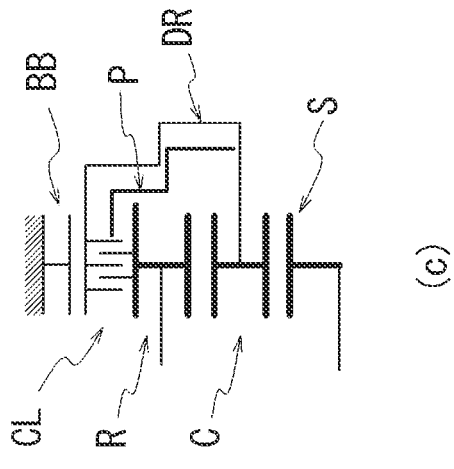
FIG. 12 is a skeleton diagram schematically showing the configuration of the transmission mechanism of a modification example.
Figure 12:
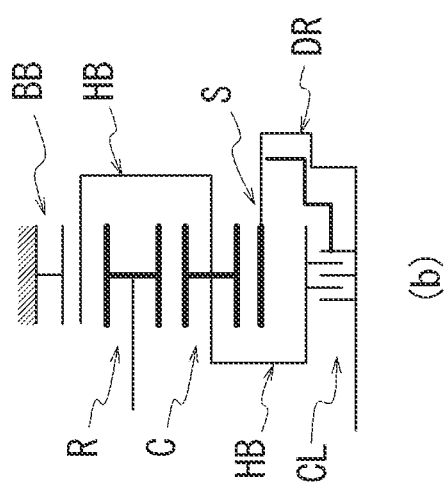
Figure 12:
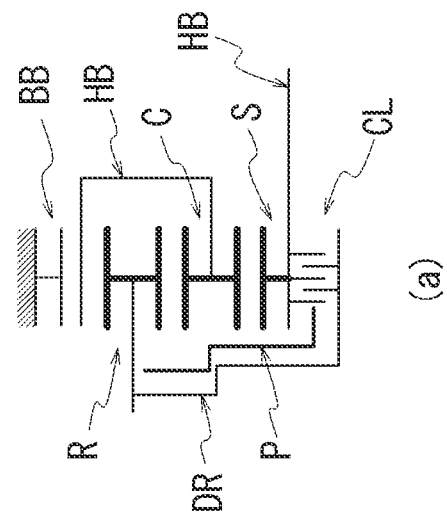
Figure 12:
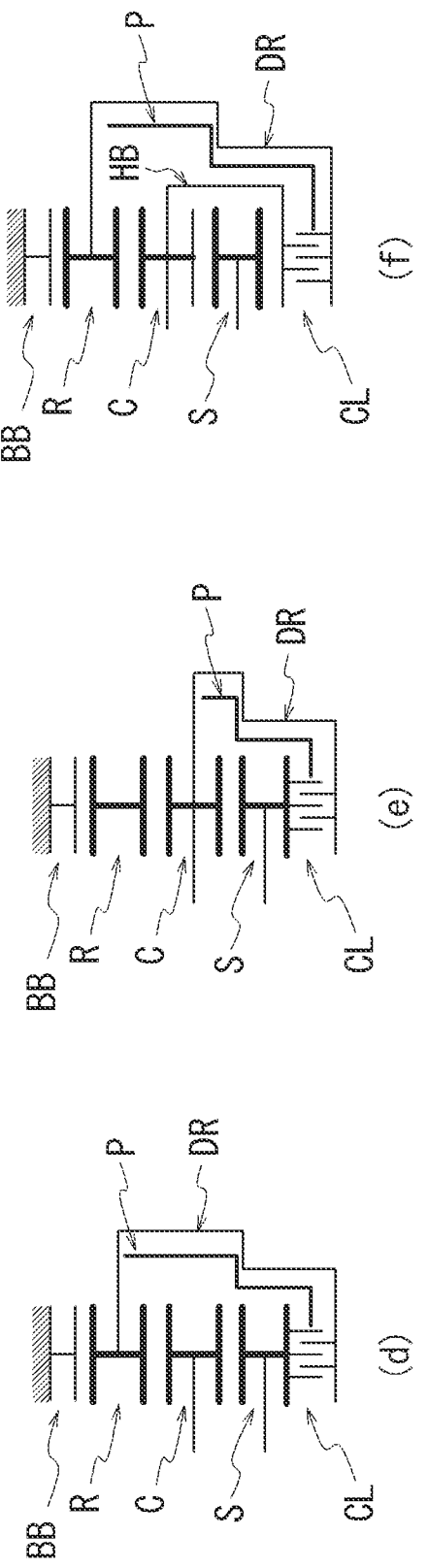

Also, when fixing the rotation of the carrier C with the band brake BB using a single pinion, the modes shown in FIG. 12 (*a*), (*b*), (*c*) are also possible.

With the mode of FIG. 12 (*a*), the sun gear S of the planetary gear set is the rotation input unit, the ring gear R is the output unit, and the band brake BB fixes the carrier C linked to the hub HB. The clutch CL engages the sun gear S, and the ring gear R linked to the clutch drum DR so they are not able to rotate relatively.

With the mode of FIG. 12 (*b*), the sun gear S of the planetary gear set is the rotation input unit, the ring gear R is the output unit, and the band brake BB fixes the carrier C linked to the hub HB. The clutch CL engages the sun gear S linked to the clutch drum DR, and the carrier C linked to the hub HB so they are not able to rotate relatively.

With the mode of FIG. 12 (*c*), the sun gear S of the planetary gear set is the rotation input unit, the ring gear R is the output unit, and the band brake BB fixes the carrier C linked to the clutch drum DR. The clutch CL engages the carrier C linked to the clutch drum DR, and the ring gear R so they are not able to rotate relatively.

Also, when fixing the rotation of the ring gear R with the band brake BB using a single pinion, the modes shown in FIG. 12 (*d*), (*e*), (*f*) are also possible. With the mode of FIG. 12 (*d*), the sun gear S of the planetary gear set is the rotation input unit, the carrier C is the output unit, and the band brake BB fixes the ring gear R. The clutch CL engages the sun gear S, and the ring gear R linked to the clutch drum DR so they are not able to rotate relatively.

With the mode of FIG. 12 (*e*), the sun gear S of the planetary gear set is the rotation input unit, the carrier C is the output unit, and the band brake BB fixes the ring gear R. The clutch CL engages the sun gear S, and the carrier C linked to the clutch drum DR so they are not able to rotate relatively.

With the mode of FIG. 12 (*f*), the sun gear S of the planetary gear set is the rotation input unit, the carrier C is the output unit, and the band brake BB fixes the ring gear R. The clutch CL engages the ring gear R linked to the clutch drum DR, and the carrier C linked to the hub HB so they are not able to rotate relatively.

Figure 13:
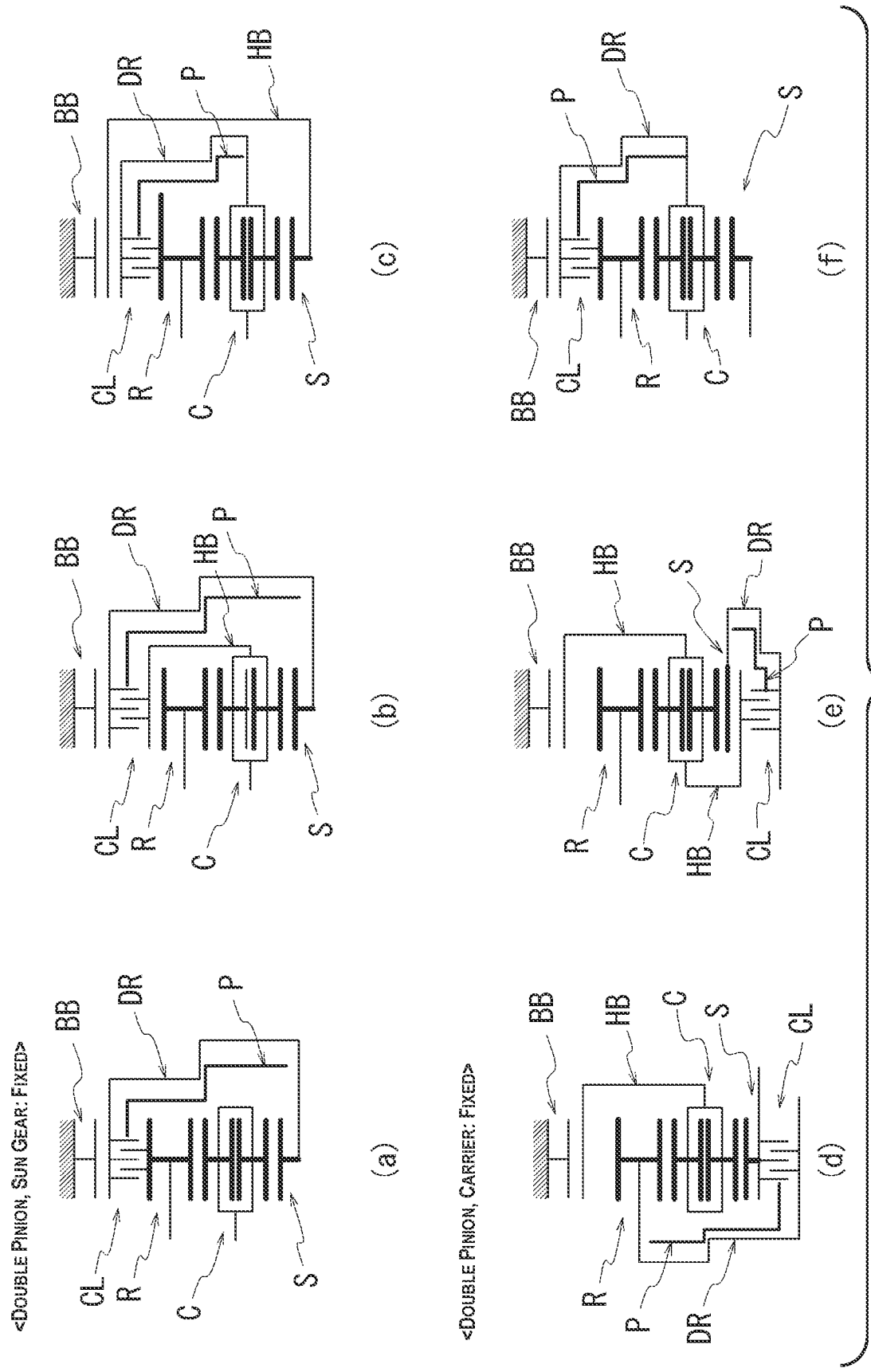
FIG. 13 is a skeleton diagram schematically showing the configuration of the transmission mechanism of a modification example.

Also, when fixing the rotation of the sun gear S with the band brake BB using a double pinion, the modes shown in FIG. 13 (*a*), (*b*), (*c*) are also possible.

With the mode of FIG. 13 (*a*), the carrier C of the planetary gear set is the rotation input unit, the ring gear R is the output unit, and the band brake BB fixes the sun gear S linked to the clutch drum DR. The clutch CL engages the ring gear R, and the sun gear S linked to the clutch drum DR so they are not able to rotate relatively.

With the mode of FIG. 13 (*b*), the carrier C of the planetary gear set is the rotation input unit, the ring gear R is the output unit, and the band brake BB fixes the sun gear S linked to the clutch drum DR. The clutch CL engages the sun gear S linked to the clutch drum DR, and the carrier C linked to the hub HB so they are not able to rotate relatively.

With the mode of FIG. 13 (*c*), the carrier C of the planetary gear set is the rotation input unit, the ring gear R is the output unit, and the band brake BB fixes the sun gear S linked to the hub HB. The clutch CL engages the carrier C linked to the clutch drum DR, and the ring gear R so they are not able to rotate relatively.

Also, when fixing the rotation of the carrier C with the band brake BB using a double pinion, the modes shown in FIG. 13 (*d*), (*e*), (*f*) are also possible.

With the mode of FIG. 13 (*d*), the sun gear S of the planetary gear set is the rotation input unit, the ring gear R is the output unit, and the band brake BB fixes the carrier C linked to the hub HB. The clutch CL engages the sun gear S, and the ring gear R linked to the clutch drum DR so they are not able to rotate relatively.

With the mode of FIG. 13 (*e*), the sun gear S of the planetary gear set is the rotation input unit, the ring gear R is the output unit, and the band brake BB fixes the carrier C linked to the hub HB. The clutch CL engages the sun gear S linked to the clutch drum DR, and the carrier C linked to the hub HB so they are not able to rotate relatively.

With the mode of FIG. 13 (f), the sun gear S of the planetary gear set is the rotation input unit, the ring gear R is the output unit, and the band brake BB fixes the carrier C linked to the clutch drum DR. The clutch CL engages the carrier C linked to the clutch drum DR, and the ring gear R so they are not able to rotate relatively.

Also, when fixing the rotation of the ring gear R with the band brake BB using a double pinion, the modes shown in FIG. 14 (a), (b), (c) are also possible.

With the mode of FIG. 14 (a), the sun gear S of the planetary gear set is the rotation input unit, the carrier C is the output unit, and the band brake BB fixes the ring gear R. The clutch CL engages the sun gear S, and the ring gear R linked to the clutch drum DR so they are not able to rotate relatively.

With the mode of FIG. 14 (b), the sun gear S of the planetary gear set is the rotation input unit, the carrier C is the output unit, and the band brake BB fixes the ring gear R. The clutch CL engages the carrier C linked to the clutch drum DR, and the sun gear S so they are not able to rotate relatively.

With the mode of FIG. 14 (c), the sun gear S of the planetary gear set is the rotation input unit, the carrier C is the output unit, and the band brake BB fixes the ring gear R. The clutch CL engages the carrier C linked to the hub HB, and the ring gear R linked to the clutch drum DR so they are not able to rotate relatively.

Above, in FIG. 11 to FIG. 14, examples of a total of 18 patterns were shown for the possible modes of the transmission mechanism.

Of this total of 18 patterns, with the mode shown in FIG. 11, the mode shown in FIG. 12 (e), the mode shown in FIG. 13 (a), and the mode shown in FIG. 13 (f), it is possible to switch between low gear level and high gear level with the output rotation of the motor 2 kept as is in the forward rotation direction.

Also, with the mode shown in FIG. 11, and the mode of FIG. 13 (a), (b), (c), the outer diameter of the clutch drum DR is the largest, so it is possible to have the clutch CL in an engaged state while keeping a margin.

Also, the clutch CL that engages with two elements of the constitutional elements of the planetary gear set (sun gear S, ring gear R, and carrier C) can be provided anywhere in the transmission mechanism.

For example, as with the modes shown in FIG. 11 (a), and FIG. 13 (a), it is possible to provide the clutch CL between the band brake BB and the ring gear R.

Furthermore, for example as with the mode shown in FIG. 12 (a), the clutch may also be provided at the inner diameter side of the sun gear S.

In this way, the clutch CL may be provided at either of the outer diameter side of the ring gear R, and the inner diameter side of the sun gear S.

The same is also true for the double pinion having two pinion gears.

As shown in FIG. 13 (a), (b), (c), and (f), the clutch CL may also be provided on the outer diameter side of the ring gear R.

As shown in FIGS. 13 (d) and (e), and FIGS. 14 (a), (b), and (c), the clutch CL may also be provided on the inner diameter side of the sun gear S.

With the mode shown in FIG. 14 (c), and the mode shown in FIG. 14 (b), for switching between the low gear level and the high gear level, it is necessary to reverse the direction of the output rotation of the motor 2.

Here, the term "connected downstream" in this specification means being in a connection relationship in which the power is transmitted from the components arranged upstream to the components arranged downstream.

For example, in the case of the transmission mechanism 3 connected downstream of the motor 2, this means that the power is transmitted from the motor 2 to the transmission mechanism 3.

Also, the term "directly connected" in this specification means that the members are connected with the ability to transmit power to each other without the interposition of another member by which the reduction ratio is converted such as a reduction mechanism, an acceleration mechanism, a transmission mechanism, etc.

The invention of the present case can be suitably applied to a power transmission device with the following three types of transmission mechanism.

The so-called three-axis type of power transmission device 1B (see FIG. 5) in which the rotation axes of the transmission mechanism 3 and the motor 2 are arranged concentrically, and the rotation axis of the motor 2, the rotation axis of the counter gear 5, and the rotation axis of the drive shafts 8 (8A, 8B) are aligned in parallel.

The so-called two-axis type power transmission device 1 (see FIG. 1) in which the rotation axes of the motor 2, the transmission mechanism 3, and the drive shafts 8 (8A, 8B) are arranged concentrically, and the rotation axis of the motor 2 and the rotation axis of the counter gear 5 are aligned in parallel.

The so-called one-axis type of power transmission device 1B (see FIG. 8) in which the rotation axes of the motor 2, the transmission mechanism 3B, and the drive shafts 8 (8A, 8B) are arranged concentrically.

Of these three types of power transmission device, the two-axis type of power transmission device 1 for which the outer diameter of the counter gear 5 is large (radial direction area is large) is preferable because it has the largest space (a large region Rx can be taken).

Above, embodiments of the invention of the present application were explained, but the invention of the present application is not limited to only the modes shown in these embodiments. Changes can be made as appropriate within the scope of the technical concept of the invention.

The invention claimed is:

1. A power transmission device comprising:
a motor having a motor shaft;
a transmission mechanism connected downstream of the motor, the transmission mechanism having a band brake, and an actuator that drives the band brake;
a reduction gear arranged downstream of the transmission mechanism; and
a case member that houses the motor, at least a part of the transmission mechanism, and the reduction gear, wherein
the case member has
an outer circumference wall that surrounds an outer circumference with respect to a radial direction perpendicular to a rotation axis of the motor shaft, and
a side wall that is linked to the outer circumference wall, and that extends outwardly in the radial direction from the outer circumference wall, and
the actuator is provided adjacent to the outer circumference wall, and adjacent to the side wall, the actuator overlapping with the band brake in the radial direction.

2. The power transmission device according to claim 1, wherein
in an axial direction, the side wall is sandwiched between the actuator and the motor.

3. The power transmission device according to claim 1, wherein
the band brake and the actuator are arranged adjacent to the outer circumference wall sandwiching the outer circumference wall.

4. The power transmission device according to claim 1, wherein
the transmission mechanism further includes a clutch and a planetary gear set, and
the actuator further overlaps with the clutch and the planetary gear set in the radial direction.

5. The power transmission device according to claim 4, wherein
in an axial direction parallel to the rotation axis of the motor shaft, the side wall is sandwiched between the actuator and the reduction gear.

6. The power transmission device according to claim 4, wherein
in an axial direction parallel to the rotation axis of the motor shaft, the side wall is sandwiched between the actuator and the motor.

7. A power transmission device comprising:
a motor having a motor shaft;
a transmission mechanism connected downstream of the motor, the transmission mechanism having a band brake, and an actuator that drives the band brake;
a reduction gear arranged downstream of the transmission mechanism; and
a case member that houses the motor, at least a part of the transmission mechanism, and the reduction gear, wherein
the case member has
an outer circumference wall that surrounds an outer circumference with respect to a radial direction perpendicular to a rotation axis of the motor shaft, and
a side wall that is linked to the outer circumference wall, and that extends outwardly in the radial direction from the outer circumference wall,
the actuator is provided adjacent to the outer circumference wall, and adjacent to the side wall, and
in an axial direction parallel to the rotation axis of the motor shaft, the side wall is sandwiched between the actuator and the reduction gear.

8. A power transmission device comprising:
a motor having a motor shaft;
a transmission mechanism connected downstream of the motor, the transmission mechanism having a band brake, and an actuator that drives the band brake;
a reduction gear arranged downstream of the transmission mechanism; and
a case member that houses the motor, at least a part of the transmission mechanism, and the reduction gear, wherein
the case member has
an outer circumference wall that surrounds an outer circumference with respect to a radial direction perpendicular to a rotation axis of the motor shaft, and
a side wall that is linked to the outer circumference wall, and that extends outwardly in the radial direction from the outer circumference wall,
the actuator is provided adjacent to the outer circumference wall, and adjacent to the side wall, and
the band brake and the actuator are arranged adjacent to the side wall sandwiching the side wall.

9. The power transmission device according to claim 8, wherein
in an axial direction parallel to the rotation axis of the motor shaft, the side wall is sandwiched between the actuator and the reduction gear.

10. The power transmission device according to claim 8, wherein
in an axial direction parallel to the rotation axis of the motor shaft, the side wall is sandwiched between the actuator and the motor.

* * * * *